United States Patent
McAlister

(10) Patent No.: US 8,311,723 B2
(45) Date of Patent: Nov. 13, 2012

(54) PRESSURE ENERGY CONVERSION SYSTEMS

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/021,658

(22) Filed: Feb. 4, 2011

(65) Prior Publication Data

US 2011/0125391 A1    May 26, 2011

Related U.S. Application Data

(60) Division of application No. 10/236,820, filed on Sep. 7, 2002, now abandoned, which is a continuation-in-part of application No. 09/716,664, filed on Nov. 20, 2000, now Pat. No. 6,446,597.

(51) Int. Cl.
  *F02M 57/06*    (2006.01)
(52) U.S. Cl. .................................. 701/104; 123/297
(58) Field of Classification Search ............... 701/103, 701/104; 123/297, 298, 169 V, 494, 435, 123/490, 499; 313/120
See application file for complete search history.

(56) References Cited

U.S. PATENT DOCUMENTS

| | | |
|---|---|---|
| 1,310,565 A | 7/1919 | Grunwald |
| 1,401,612 A | 12/1921 | Landgrebe |
| 1,451,384 A | 4/1923 | Whyte |
| 1,693,931 A | 12/1928 | Lowe |
| 1,765,237 A | 6/1930 | King |
| 2,255,203 A * | 9/1941 | Wiegand ................ 313/11.5 |
| 2,391,220 A * | 12/1945 | Beeh ........................ 313/120 |
| 2,459,286 A * | 1/1949 | Wiegand et al. ......... 313/11.5 |
| 2,826,395 A | 3/1958 | Petty |
| 3,060,912 A | 10/1962 | May |
| 3,094,974 A | 6/1963 | Barber |
| 3,173,409 A | 3/1965 | Warren |
| 3,315,650 A | 4/1967 | Bishop et al. |
| 3,373,724 A * | 3/1968 | Papst ........................ 123/297 |
| 3,682,142 A | 8/1972 | Newkirk |

(Continued)

FOREIGN PATENT DOCUMENTS

DE      2410473      9/1975

(Continued)

OTHER PUBLICATIONS

Davis et al., "Fuel Injection and Positive Ignition—A Basis for Improved Efficiency and Economy", SAE Progress in Technology Review vol. II, Society of Automotive Engineers, 1967, pp. 343-357.

(Continued)

*Primary Examiner* — Mahmoud Gimie
(74) *Attorney, Agent, or Firm* — Susan D. Betcher

(57) ABSTRACT

The present disclosure relates generally a fuel injector configured to inject fuel into a combustion chamber. The fuel injector includes a body having a base portion opposite a nozzle portion, wherein the base portion is configured to receive the fuel into the body, and the nozzle portion is configured to be positioned adjacent to the combustion chamber. The fuel injector also includes a valve assembly carried by the base portion of the body. The valve assembly may have a first valve coupled to a first actuator and a second valve coupled to a second actuator. The fuel injector further includes an igniter carried by the nozzle portion of the body and configured to ignite the fuel in the combustion chamber.

20 Claims, 8 Drawing Sheets

U.S. PATENT DOCUMENTS

| | | | |
|---|---|---|---|
| 3,754,841 A | 8/1973 | Grabb et al. | |
| 3,792,762 A | 2/1974 | Ball et al. | |
| 3,815,555 A | 6/1974 | Tubeuf | |
| 3,830,204 A | 8/1974 | McAlister | |
| 3,908,625 A * | 9/1975 | Romy | 123/267 |
| 3,926,169 A * | 12/1975 | Leshner et al. | 123/297 |
| 3,976,034 A | 8/1976 | Shinohara et al. | |
| 3,980,061 A | 9/1976 | McAlister | |
| 4,003,343 A | 1/1977 | Lee | |
| 4,020,803 A | 5/1977 | Thuren et al. | |
| 4,041,910 A | 8/1977 | Houseman | |
| 4,046,522 A | 9/1977 | Chen et al. | |
| 4,086,877 A | 5/1978 | Henkel et al. | |
| 4,086,878 A | 5/1978 | Eisele et al. | |
| 4,099,489 A | 7/1978 | Bradley | |
| 4,108,114 A | 8/1978 | Kosaka et al. | |
| 4,109,461 A | 8/1978 | Fujitani et al. | |
| 4,111,160 A | 9/1978 | Talenti | |
| 4,140,090 A | 2/1979 | Lindberg | |
| 4,165,616 A | 8/1979 | Pierpoline | |
| 4,181,100 A | 1/1980 | Yamane et al. | |
| 4,211,200 A | 7/1980 | Rocchio et al. | |
| 4,235,533 A | 11/1980 | Norris | |
| 4,249,386 A | 2/1981 | Smith et al. | |
| 4,253,428 A | 3/1981 | Billings et al. | |
| 4,340,013 A | 7/1982 | Lindstrom | |
| 4,362,137 A | 12/1982 | O'Hare | |
| 4,373,671 A * | 2/1983 | Giardini | 239/585.5 |
| 4,376,097 A | 3/1983 | Emelock | |
| 4,381,740 A | 5/1983 | Crocker | |
| 4,408,595 A | 10/1983 | Broyles et al. | |
| 4,418,653 A | 12/1983 | Yoon | |
| 4,441,469 A | 4/1984 | Wilke | |
| 4,442,801 A | 4/1984 | Glynn et al. | |
| 4,475,484 A | 10/1984 | Filho et al. | |
| 4,503,813 A | 3/1985 | Lindberg | |
| 4,515,135 A | 5/1985 | Glass | |
| 4,547,356 A | 10/1985 | Papineau | |
| 4,603,671 A * | 8/1986 | Yoshinaga et al. | 123/467 |
| 4,642,992 A | 2/1987 | Julovich | |
| 4,716,859 A | 1/1988 | Konig et al. | |
| 4,722,303 A | 2/1988 | Leonhard | |
| 4,768,341 A | 9/1988 | Nozaki et al. | |
| 4,834,033 A | 5/1989 | Larsen | |
| 4,918,916 A | 4/1990 | Tiberg | |
| 4,967,708 A | 11/1990 | Linder et al. | |
| 4,971,009 A | 11/1990 | Washino et al. | |
| 4,982,708 A | 1/1991 | Stutzenberger | |
| 5,010,734 A | 4/1991 | Ho | |
| 5,067,467 A | 11/1991 | Hill et al. | |
| 5,108,266 A | 4/1992 | Hewitt | |
| 5,149,600 A | 9/1992 | Yamase et al. | |
| 5,153,834 A | 10/1992 | Abo et al. | |
| 5,183,011 A | 2/1993 | Fujii et al. | |
| 5,207,185 A | 5/1993 | Greiner et al. | |
| 5,218,941 A | 6/1993 | Suzuki et al. | |
| 5,222,481 A | 6/1993 | Morikawa | |
| 5,228,293 A | 7/1993 | Vitale | |
| 5,279,260 A | 1/1994 | Munday | |
| 5,305,714 A | 4/1994 | Sekiguchi et al. | |
| 5,343,699 A | 9/1994 | McAlister | |
| 5,357,908 A | 10/1994 | Sung et al. | |
| 5,394,852 A | 3/1995 | McAlister | |
| 5,399,251 A | 3/1995 | Nakamats | |
| 5,488,932 A | 2/1996 | Serafini | |
| 5,497,744 A | 3/1996 | Nagaosa et al. | |
| 5,512,145 A | 4/1996 | Hollenberg | |
| 5,522,358 A | 6/1996 | Clarke | |
| 5,531,199 A | 7/1996 | Bryant et al. | |
| 5,632,870 A | 5/1997 | Kucherov | |
| 5,692,458 A | 12/1997 | Green | |
| 5,715,788 A | 2/1998 | Tarr et al. | |
| 5,837,110 A | 11/1998 | Dean | |
| 5,899,071 A | 5/1999 | Stone et al. | |
| 5,983,855 A | 11/1999 | Benedikt et al. | |
| 5,991,670 A | 11/1999 | Mufford et al. | |
| 6,155,212 A | 12/2000 | McAlister | |
| 6,260,546 B1 | 7/2001 | Vaughn | |
| 6,289,869 B1 | 9/2001 | Elliott | |
| 6,446,597 B1 | 9/2002 | McAlister | |
| 6,463,889 B2 | 10/2002 | Reddy | |
| 6,756,140 B1 | 6/2004 | McAlister | |
| 6,787,258 B2 | 9/2004 | Prerad | |
| 7,191,738 B2 | 3/2007 | Shkolnik | |
| 7,628,137 B1 | 12/2009 | McAlister | |
| 7,785,451 B2 | 8/2010 | Lin et al. | |
| 7,927,434 B2 | 4/2011 | Nakamura et al. | |
| 2003/0012985 A1 | 1/2003 | McAlister | |
| 2004/0045823 A1 | 3/2004 | Kawase et al. | |
| 2004/0163954 A1 | 8/2004 | Gurry et al. | |
| 2006/0060468 A1 | 3/2006 | Weinand | |
| 2006/0213760 A1 | 9/2006 | Tao et al. | |
| 2007/0062813 A1 | 3/2007 | Gentalen et al. | |
| 2007/0221500 A1 | 9/2007 | Hausselt et al. | |
| 2008/0047831 A1 | 2/2008 | Richert et al. | |
| 2009/0020412 A1 | 1/2009 | Takenouchi et al. | |
| 2009/0065438 A1 | 3/2009 | Chau | |

FOREIGN PATENT DOCUMENTS

| | | |
|---|---|---|
| DE | 3151368 | 8/1982 |
| DE | 3443022 | 5/1986 |
| FR | 2262195 | 9/1975 |
| GB | 1002694 | 8/1965 |
| GB | 1038490 | 8/1966 |
| GB | 1336636 | 11/1973 |
| GB | 2112455 | 7/1983 |
| WO | WO-95/27845 | 10/1995 |

OTHER PUBLICATIONS

Simko et al., "Exhaust Emission Control by the Ford Programmed Combustion Process-PROCO", SAE Paper No. 720052, pp. 249-264.

"Clean, Efficient and Lightweight Propulsion Systems for a Better World," EcoMotors International, Accessed May 19, 2011, http://www.ecomotors.com. 2 pages.

Schwartz, Ariel, "Bill Gates, Khosla Ventures Inejct $23.5 Million Into Engine Startup EcoMotors," FastCompany, Jul. 12, 2010, Accessed May 31, 2011, http://www.fastcompany.com/1669471/bill-gates-khosla-ventures-inject-235-million-into-efficient-engine-startup-ecomotors. 2 pages.

Jim Stanam; "How Can Engines Be Modified to Run Using Alternative Fuels?"; Lockheed Martin; Orlando, FL; Jan. 2, 1999, 4 pages.

Robert Priest, Appeal T 383/04-3.2.4 in respect of European Patent Application No. 94920655.1-2311 of Roy E. McAlister; "Declaration of Robert Priest"; Nov. 30, 2005; 3 pages.

Collier Technologies Technology Description; "HCNG"; Nov. 2005; 4 pages.

James W. Heffel, University of California; "Hydrogen Powered Shelby Cobra: Vehicle Conversion"; 2003; 14 pages.

European Search Report for European Application No. 94920655.1; Date of Mailing: Jun. 27, 1997; 9 pages.

European Search Report for European Application No. 05027548.6; Date of Mailing: Feb. 11, 2009; 7 pages.

European Search Report and Written Opinion for EP Application No. 05027548.6; Dated: Sep. 20, 2010; 13 pages.

European Search Report and Written Opinion for EP Application No. 05027548.6; Dated: Mar. 4, 2009; 6 pages.

Non-Final Office Action for U.S. Appl. No. 10/236,820; Date of Mailing: Jun. 30, 2004; 6 pages.

Non-Final Office Action for U.S. Appl. No. 10/236,820; Date of Mailing: Jan. 7, 2005; 4 pages.

Non-Final Office Action for U.S. Appl. No. 10/236,820; Date of Mailing: May 16, 2006; 10 pages.

Final Office Action for U.S. Appl. No. 10/236,820; Date of Mailing: May 17, 2007; 9 pages.

Non-Final Office Action for U.S. Appl. No. 10/236,820; Date of Mailing: Apr. 15, 2009; 13 pages.

Final Office Action for U.S. Appl. No. 10/236,820; Date of Mailing: Dec. 24, 2009; 7 pages.

Charles W. Lopez, Kenneth W. Stone; Contractor Report; Performance of the Southern California Edison Company Stirling Dish; Oct. 1993.

Finegold, et al., "Dissociated Methanol as a Consumable Hydride for Automobiles and Gas Turbines", Jun. 1982, pp. 1359-1369.

Finsterwalder, "Deutz Converts Operation by Adding High-Tension Ignition System", Automotive Engineering, Dec. 1971, pp. 28-32.

\* cited by examiner

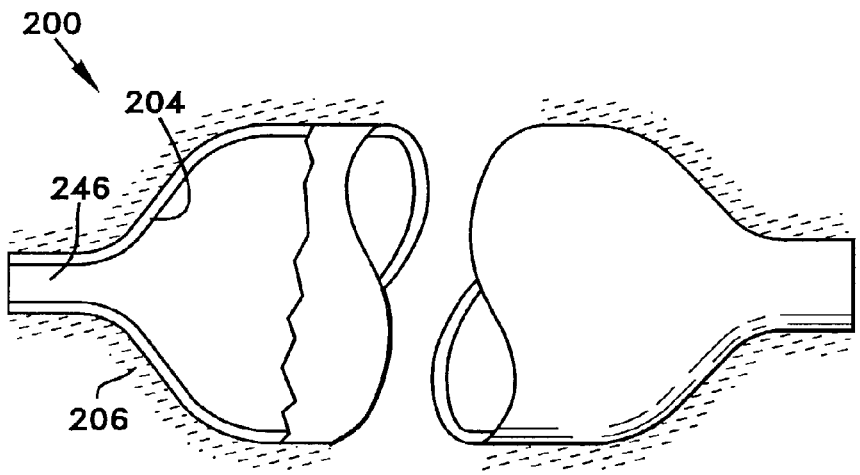
FIGURE 6
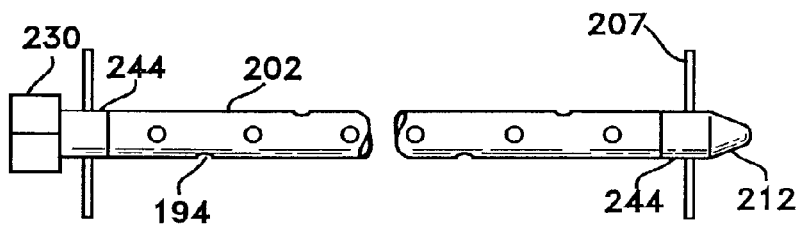
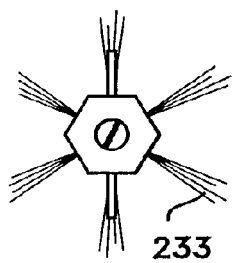
FIGURE 9   FIGURE 7
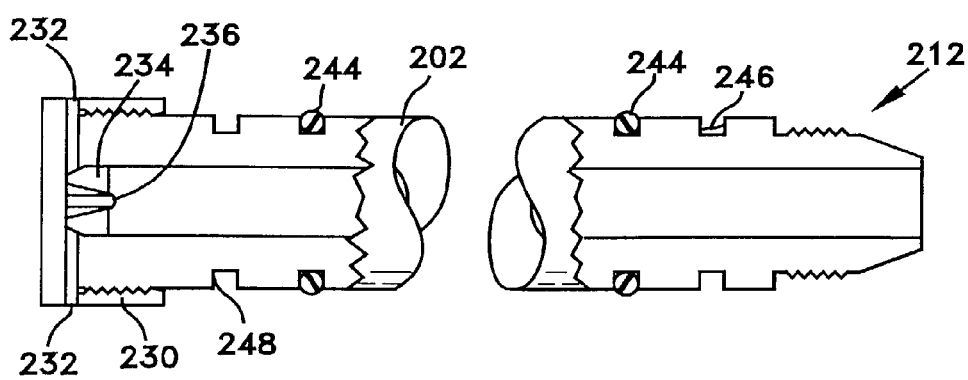
FIGURE 8

FIGURE 16
FIGURE 17
FIGURE 18
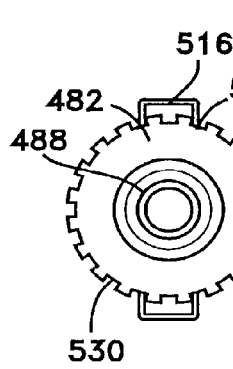
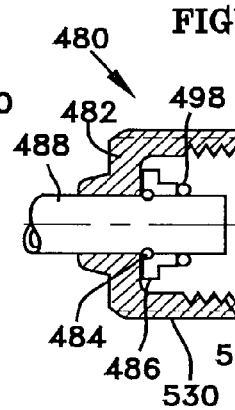
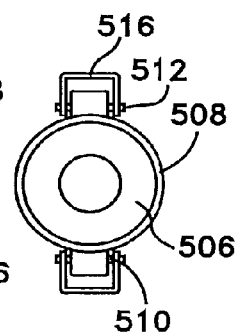
FIGURE 19
FIGURE 20
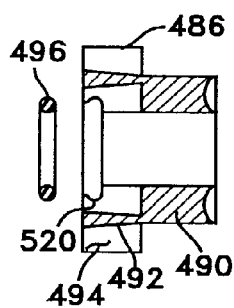
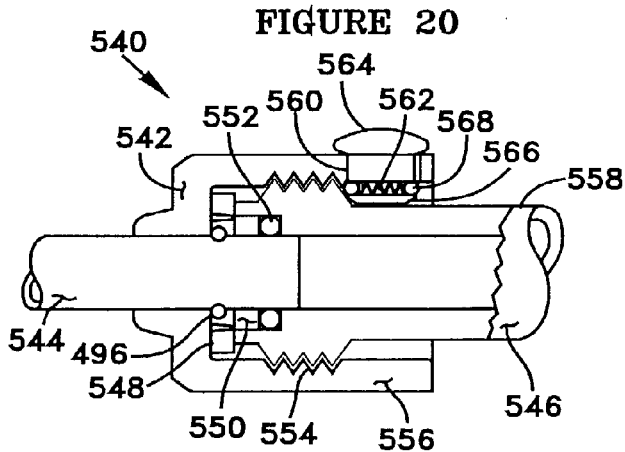

PRESSURE ENERGY CONVERSION SYSTEMS

CROSS-REFERENCE TO RELATED APPLICATIONS

The present application is a division of U.S. patent application Ser. No. 10/236,820, filed Sep. 7, 2002, which is a continuation in part of U.S. patent application Ser. No. 09/716,664, filed Nov. 20, 2000, now U.S. Pat. No. 6,446,597. The disclosure of each of these applications is incorporated herein by reference in their entirety.

This invention relates to improved fuel storage, delivery, and utilization in the operation of energy conversion systems and combustion engines.

BACKGROUND OF THE INVENTION

Direct combustion chamber fuel injection technology has been advanced for improving the thermal efficiency of internal combustion engines such as the venerable Diesel engine and for gasoline engines designed to achieve greater fuel efficiency. The most fuel efficient engine types rely upon direct injection of fuel into the combustion chamber to produce stratified-charge combustion.

Difficult problems that have prevented most of the 800 million engines now existing from benefiting from stratified charge technology include: expensive, high pressure fuel pumps and injectors with small orifices are required to deliver fuel at high pressure for purposes of producing required surface-to-volume ratios for clean burning; dry fuels cause such pumps and fuel injectors to fail prematurely; ignition of preferred clean fuels requires ionizing conditions in air-fuel mixtures to initiate combustion which has defeated attempts to utilize compression ignition or the combination of fuel injectors and spark plugs in separate locations of the combustion chamber; gaseous fuels require much larger passageways than liquid fuels for equal power ratings and have not been directly injected because of the bulky, high-inertia, slow-acting components required for conventional fuel pumps and injectors; and because the parasitic losses for pumping and metering clean fuels has been unacceptable.

SUMMARY OF THE INVENTION

An object of the present invention is to overcome the problems noted above. In accordance with the principles of the present invention, this objective is accomplished by providing a process for operating a combustion engine which comprises the steps of supplying a fuel that is pressurized to a much lower magnitude than required by Diesel and other direct-injection engines require because the differential pressure at the time of delivery is normalized to a minimum and because of the greater air penetration and diffusion tendencies of prepared lower viscosity gaseous and/or high vapor pressure fuel selections.

Another object is to provide a fuel injection system that prevents the pressure produced during combustion chamber events such as compression and combustion from causing backflow of fuel in the delivery system to the fuel storage system.

Another object of the present invention is to minimize premature mixing of an oxidant such as air from the combustion chamber with fuel being delivered until desired mixing as a result of controlled actuation of the fuel delivery system.

It is an object of the invention to densify the delivery of compressible fuel fluids to allow more compact fuel injection systems.

It is an object to perform electrolysis energy conversion that converts electricity into pressurized storage of chemical reactants and to occasionally utilize pressurized chemical reactants in a fuel cell mode or combustants in a heat engine to increase rate of reaction or to produce expansive work in one or more devices including a reversible fuel cell, expansion motor, and heat releasing combustor.

It is an object of the invention to provide a low cost compact fuel metering and control system with minimum actuation energy requirements to facilitate substitution of clean fuels and low-heat content fuels in place of diesel and gasoline fuels.

Another related object is to facilitate beneficial thermochemical regeneration of waste heat rejected by the heat engine by reacting at least one conventional fuel containing hydrogen and carbon with an oxygen donor using substantial quantities of the waste heat to produce a mixture of engine-fuel containing substantial quantities of hydrogen and utilizing the engine-fuel to operate a combustion engine.

A corollary object is to facilitate the practical and convenient use of gaseous fuels in a combustion engine with a direct injection system.

Another object of the present invention is to operate an internal combustion engine with fluid fuels including gases and liquids that may be stored in pressurized containers comprising the steps of injecting the fuel near top dead center conditions of the combustion chambers until the storage pressure is reduced due to depletion of the storage inventory and then injecting the fuel progressively earlier in the compression and then during intake conditions of the combustion chambers to facilitate greater range from the fuel storage system.

An object of the present invention is to provide method, apparatus, and a process for monitoring and characterizing the condition of each combustion chamber of a combustion engine.

An object of the present invention is to provide a process for monitoring, characterizing, and controlling direct fuel injection into a combustion chamber along with ignition and combustion of such fuel for the purpose of minimizing emissions such as oxides of nitrogen, carbon monoxide, and hydrocarbons.

An object of the present invention is to provide a process for monitoring and characterizing the ignition and combustion of fuel that has been injected into a combustion chamber along with combustion of fuel from another source to enable optimized fail safe and efficiency achievements.

An object of the present invention is to provide rapid fail safe operation of a combustion engine.

An object of the present invention is to optimize fuel delivery, combustion, and power development of a combustion engine.

An object of the present invention is to optimize fuel delivery, combustion, and power development by operation of energy conversion devices at elevated pressures.

An object of the present invention is to safely store and regulate the delivery of hydrogen and other highly volatile fuel selections on board a vehicle.

It is an object of the invention to provide improved safety concerning storage and transfer of pressurized fluids.

It is an object of the invention to compactly store hydrogen and other alternative fuels for efficient and safe replacement of gasoline and diesel fuels.

It is an object of the present invention to reduce the weight and complexity of fluid storage and transfer components including valves, fittings, regulators, and related hardware.

It is an object to provide more assured connection and disconnection operations by relatively untrained persons that work on fluid storage and delivery systems.

It is an object of the invention to provide leak-free connection of high-pressure fluid delivery conduits with finger-tight anti-loosening connections.

It is an object to directly convert stored energy into work and useful heat with minimum loss.

It is an object to reduce the materials content and cost of energy-storage, energy-conversion, and emergency-disposal systems.

It is an object to provide materials for energy storage and conversion substantially from natural gas and/or renewable hydrocarbon resources.

It is an object of the invention to provide leak-free connection of fluid delivery conduits with fittings that are easily manipulated in constrained spaces and hard to reach places.

It is an object of the invention to provide assured sealing of composites of metal components and plastic components with greatly differing thermal expansion coefficients and elastic modulus characteristics.

It is an object to provide compact energy conversion that utilizes storage of energy as chemical and pressure potentials.

It is an object of the invention to provide multiple energy conversion functions from chemical and pressure storage potentials.

It is an object of the invention to provide load leveling for natural gas and electricity distribution systems with a safe on-site conversion system that stores energy compactly and safely while providing rapid response to demand and changing load conditions.

It is an object of the invention to provide electricity generation with much lower requirement for copper and other expensive metals.

It is an object of the invention to integrate a hybrized high pressure expander and reversible fuel cell to provide adaptively optimized energy conversion.

It is an object of the invention to convert rectilinear thrust into electricity by utilization of charged reciprocating components that accelerate motion of electrical charges in stationery circuits to produce useful electrical current.

It is an object of the invention to convert rectilinear thrust into electricity by utilization of charged reciprocating components that accelerate motion of electrical charges in stationery circuits to produce useful electrical current and to utilize changes in such current magnitude in an electricity transformer.

Another object is to provide unthrottled oxidant entry to the combustion chamber of an engine along with direct injection of fuel.

Another object is to provide precision monitoring of combustion chamber conditions to facilitate computer optimized fuel injection and spark ignition by an integral device that replaces the ordinary spark plug and greatly reduces curb weight along with component costs by replacing the ordinary distributor, inlet manifold throttling valve assembly, ignition coil, and negates the need for a catalytic reactor.

These and other objects of the present invention will become more apparent during the course of the following detailed description and appended claims.

My invention may be best understood with reference to the accompanying drawings, wherein an illustrative embodiment is shown.

BRIEF DESCRIPTION OF THE DRAWINGS

FIG. 6 is a longitudinal view of a device constructed in accordance with the principles of the present invention for incorporation with the principles of FIG. 5.

FIG. 7 is an exploded view of related components utilized in operation according to the principles of the invention.

FIG. 8 is a magnified schematic including a partial sectional view of an embodiment constructed in accordance with the invention.

FIG. 9 is a schematic view of a device constructed and operated in accordance with the invention.

FIG. 16 is an end view of an embodiment of the invention for practicing the principles of the invention.

FIG. 17 is a partial sectional view of an embodiment of the invention.

FIG. 18 is an end view of an embodiment of the invention.

FIG. 19 is a partial sectional view of an embodiment of the invention for practicing the principles of the invention.

FIG. 20 is a partial sectional view of the invention.

DESCRIPTION OF THE PREFERRED EMBODIMENTS

The difficult problems of fuel storage, delivery, combustion-chamber metering, adequate fuel-injection penetration, and effective distribution into a pressurized combustion chamber have prevented beneficial use of stratified charge combustion techniques in nearly all of the world's population of 800 million engine applications. Past attempts have been plagued with problems including corrosion, erosion, wear, and high costs associated with fuel pressurization and high pressure fuel delivery systems for directly injecting fuel to the combustion chamber. The system shown in FIG. 1 eliminates these difficult problems and provides self-correcting features in direct injection systems for readily achieving stratified charge operation.

Figure 1:
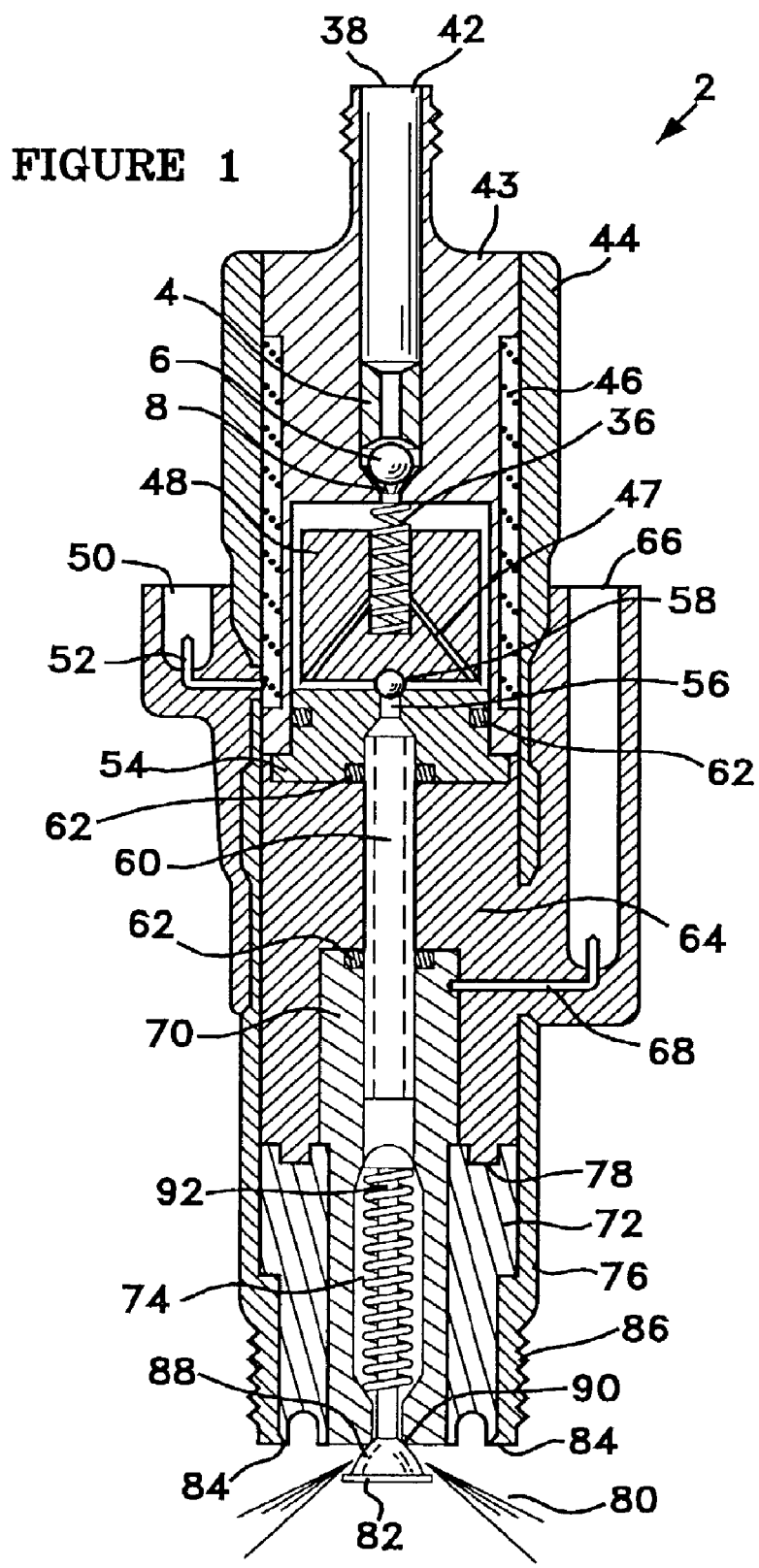
FIG. 1 is a longitudinal sectional view of a device constructed in accordance with the principles of the present invention for directly injecting and igniting fuel in the combustion chamber of a heat engine.

As shown in FIG. 1, pressurized fuel enters embodiment 2 at suitable fitting 38, travels through filter well 42, and is prevented from entering the combustion chamber as fuel spray 80 until a short time before pressure increase is desired for the power cycle in the combustion chamber of an engine. The pressure normalization valve function may be accomplished by numerous embodiments such as sufficiently strong spring 36 to keep valve seal 58 closed against combustion chamber pressure or the means illustrated by component 6 shown in FIG. 1. A suitable pressure normalization valve assembly as shown consists of valve seat 4, moveable valve 6, and valve retainer 8. Valve 6 is normally sealed against seat 4 and causes the pressure produced in the combustion chamber to be exerted to all forward-flow component passages after valve 6 including solenoid valve 48, passage 60, and the surface passageways between 88 and 90 as shown.

Thus, the pressure that metering valve 48 must overcome in order to quickly open is the pressure difference between the supply pressure at fitting 38 and the combustion chamber pressure to which fuel delivery system 2 is attached and sealed by threaded connection 86. This pressure difference may be relatively small such as 1 to 30 PSI over combustion chamber pressure in order to produce the desired gaseous fuel delivery rate and penetration pattern into the combustion chamber as needed to provide improved engine performance and efficiency in all modes of operation from idle to full power. This allows the use of a relatively small, low power solenoid valve sub-assembly and the resulting fuel injector and ignition assembly to be accomplished in a surprisingly small overall package compared to past approaches. It also allows the pressure control system to be a simple and inexpensive pressure regulator means for delivery of fuels from compressed gas or vapor pressurized liquid storage.

At the desired time, fuel is allowed to pass solenoid poppet 48 which is actuated against compression spring 36 by an electromagnetic force resulting from the flow of electric current in insulated winding 46. Poppet 48 is preferably moved against the direction of incoming fuel flowing through holes 47 as shown. Voltage to drive current through coil 46 is supplied by connection 52 within dielectric well 50. Coil 46 may be grounded to conductive body 43 or returned by suitable connection (not shown) similar to connection 52. In order to assist operation at high engine speeds, the pressure normalization valve may include means for positive closure. Illustratively, seat 4 may be made from a suitable permanent magnet material such as Alnico 5 or other similar materials including nickel coated or polymer coated permanent magnet material selections.

Moveable element 6 may be of a suitable shape such as a ball made of hardened Type 440 C stainless steel. Moveable element 6 may also be retained by a suitable spring or urged to the closed position against seat 4 by electromagnetic attraction. It is preferred to keep moveable element 6 from restricting flow in the forward direction by providing flow groves or slots in surface 8 as shown or by some other suitable geometry for minimum impedance to fuel flow towards the combustion chamber. In low cost engine applications it is suitable to utilize a permanent magnet material for moveable element 6 to reduce the material expense while accomplishing the desired quick and positive closure action of element 6 against a magnetically susceptible seat 4.

Figure 3:
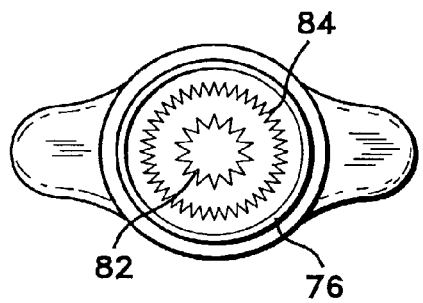
FIG. 3 is an end view of the device of FIG. 1 showing the location of ignition components.

High voltage for ignition is delivered by a suitable spark plug wire and terminal 68 in high voltage well 66. Connection 68 delivers the high voltage to conductive nozzle assembly 70. High voltage is carried by compression spring 74 to wire bar 92 to points 82. Spark plasma is developed across the gap between 82 and 84 as fuel 80 is sprayed into air in the gap shown for fuel ignition. FIG. 3 shows the end view of the gap and spark points 82 and 84.

Fuel flows past metering body 54 to dielectric tube 60 when poppet 48, along with suitable seal 58 is lifted from orifice seat 56. Seal 58 may be a polished ball made from a carbide such as tungsten carbide or ceramic such as sapphire for extremely long life applications or a fluoropolymer elastomer for applications in engines used in such applications as garden equipment and lawn mowers. Tube 60 may be sealed by any suitable means including O-rings 62 to prevent leakage of the engine-fuel. Feature 78 seals dielectric 64 to insulator 72. Fuel is delivered from tube 60 to electrically conductive nozzle 70. Compression spring 74 acts against headed wire bar 92 that is attached to valve poppet assembly 88 to keep 88 closed against 90 except when fuel flows past the orifice between 88 and 90.

Poppet assembly 88 is normally at rest against seat 90 of nozzle 70. Moveable element 88 may be formed in any suitable shape as may seat 90 to produce the desired spray pattern 80 for the particular combustion chamber that the invention serves. It is essential to minimize the fuel volume contained above 90, in passageway 60, and the valve chamber for valve 48 to restrict the back flow of gases from the combustion chamber to just accomplish pressurization of the volume between seats 90 and 6 at the highest intended speed of operation.

Preferred integration of the fuel metering means, valve 48; pressure equalization means, valve 6; and delivery means, conduit 60; into embodiment 2 which is directly attached and sealed to the combustion chamber accomplishes compaction and cost reduction far better than a series connection of separate components and provides an efficient, robust and easily manageable unit for underhood installation in space constricted areas to allow rapid replacement of spark plugs or fuel injectors with the present invention which is called SmartPlugs or SparkInjectors in various applications.

It is the purpose of spray pattern 80 to produce a great degree of air utilization in combustion reactions for minimizing oxides of nitrogen, unburned hydrocarbons, carbon monoxide, and heat losses from combustion products after ignition. In application on smaller engines, it is often most suitable to provide a large included angle for a concave conical seat 90 for use with a convex conical poppet 88 of slightly smaller included angle. Fuel combustion is extremely fast because of the large surface to volume spray that is presented. The angle chosen for concave conical seat 90 is usually optimized for the purpose of directing the conical fuel spray elements along the longest possible path before intersecting a surface of the combustion chamber. Ignition may occur at any desired time including the beginning of fuel entry into the combustion chamber and continue throughout the time of fuel flow into the combustion chamber. This provides the greatest air utilization and the longest burning time for controlled-temperature fuel combustion before approaching a quench zone of the combustion chamber. My invention provides an included angle of entry and variable gap between 88 and 90 as a function of fuel pressure and viscosity. At maximum torque production, high-speed conditions the amount of fuel delivery is much larger as a result of increasing the pressure at 38 and may occur during a greater number of degrees of crankshaft rotation. My invention provides optimized air utilization for different flame speeds by providing an included angle for the fuel cone that aims the entering rays of injected fuel at the outer rim of the piston during the highest fuel flow rate of the intended duty cycle.

This combination of features make my invention applicable to large engines having combustion chamber diameters of 12" or more and to small combustion chambers of the size suitable for model airplane use.

Figure 2:
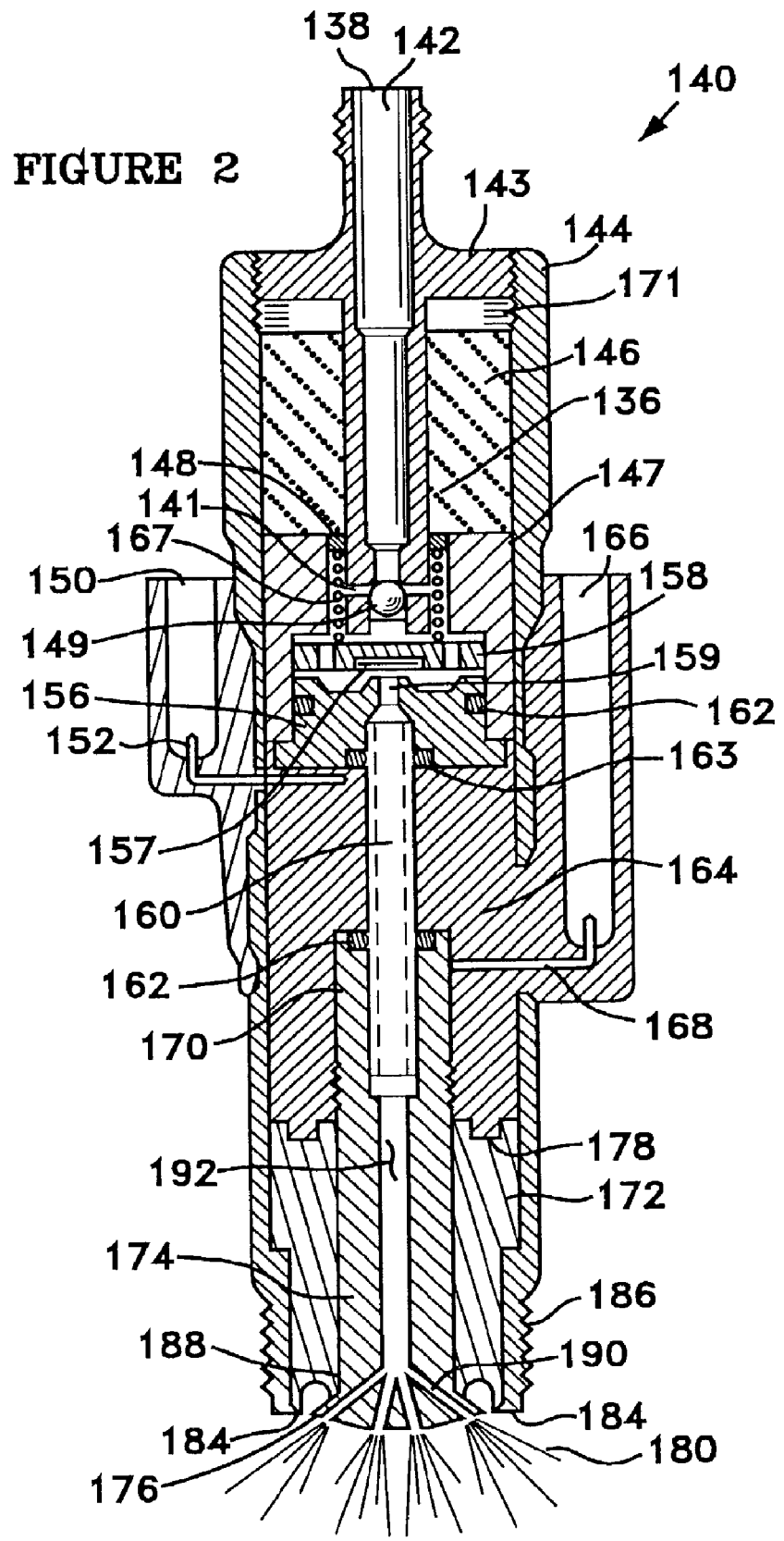
FIG. 2 is a longitudinal sectional view of another embodiment of the system provided in accordance with the principles of the present invention for directly injecting and igniting fuel in the combustion chamber of a heat engine.

FIG. 2 shows another SmartPlug embodiment 140 in which the high voltage needed for spark discharge is produced by transforming the low voltage applied to solenoid winding 136 to the desired high voltage in integral winding 146. High voltage produced in transformer 136/146 is applied through an integral connection to 168 within dielectric well 166 and thus to conductive nozzle 170 to produce plasma discharge for igniting fuel/air mixtures 180 formed in the gaps between 184 and the bottom of nozzle 176 around a fuel injection orifice or a group of orifices 190 as shown.

Pressurized fuel delivered through fitting 138 flows through filter well 142 and displaces pressure normalization valve 149 to flow when solenoid valve disk 158 is actuated to the open position against the force of suitable compression spring 167 as shown. Upon opening valve 158, fuel flows through one or more radial passageways 141, the annular well for spring 167, around and through the holes surrounding the face seal 157 in solenoid valve 158 as shown. Releasing valve 158 forces the integral elastomeric face seal 157 at the bottom of 158 to bubble-tight closure on the face of orifice 159 in fitting 156 as shown. O-rings 162 ultimately seal the components conveying fuel as shown.

It is preferred to make fitting 156 from a suitable dielectric such as glass or mineral filled polymer, glass, or ceramic. This allows the assembly to utilize the dielectric strength and position of fitting 156 for compact and efficient containment of high voltage applied to conductive nozzle 170.

It is preferred to incorporate one or more combustion chamber condition sensors in SmartPlug 140. A suitable transducer consists of a piezoelectric disk gasket located between fitting 156 and dielectric 164. Illustrative of another transducer configuration is ring seal 163 which is preferably provided as a piezoelectric elastomer that responds to pressure produced in the combustion chamber which causes force to be transmitted through conductive nozzle 174, dielectric structure 172, and dielectric 164 to provide continuous monitoring of the combustion chamber condition. The transducer signal from piezoelectric seal 163 is preferably taken by an electrically isolated connector 152 within dielectric well 150 to micro-computer 171 which is connected to a suitable external power supply (not shown) along with appropriate power relays controlled by embedded computer 171.

It is preferred to locate computer 171 in close proximity to the fuel passageway as shown to benefit from the cooling capacity of fuel traveling through assembly 143. The cylinder pressure signal produced by transducer 163 is utilized to determine variable cylinder conditions during the inlet, compression, power, and exhaust functions of the engine. Fuel injection and ignition timing are varied by integral micro-computer 171 as shown. Computer 171 adaptively varies the fuel injection amount and timing along with ignition timing to produce the best fuel efficiency, greatest power, and/or least emissions as desired while featuring unthrottled air intake to the combustion chamber for maximizing thermal efficiency. This provides a precise and adaptively optimized but greatly simplified "distributorless" fuel injection and ignition system for improved control and efficiency of combustion engine operation.

Actuation of valve 158 is preferably controlled to be at a time at which the pressure of the combustion chamber which is transmitted through injection conduits 190 and 192 within conductor 174 to the bore of dielectric conduit 160 approaches the fuel delivery pressure at fitting 138 to minimize the necessary force produced by solenoid assembly 143 while benefiting from maximum density flow of pressurized gaseous fuel. This combination of benefits allow integrated assembly 140 to be quite small compared to conventional approaches with large metering valves. Solenoid assembly 143 includes coils 136 and 146, pole piece 147, pole separator and seal 148, fitting 156, a suitable metering valve 158, spring 167, and pressure-control valve 149 within magnetically susceptible case 144 which is connected and sealed to the combustion chamber as needed such as by threaded portion 186.

This combination of features allow solenoid assembly 143 to require much less power, operate quicker, to cause much less heat generation and to be much smaller than conventional fuel injectors. This advantage allows an integrated assembly that readily replaces ordinary spark plugs and provides precision monitoring of combustion chamber conditions to facilitate computer optimized fuel injection and spark ignition by an integral device, Smartplug 140, that replaces the ordinary spark plug. This greatly reduces curb weight along with component costs by elimination of the ordinary distributor drive, distributor, inlet manifold throttling valve assembly, inlet throttling valve drive system, ignition coil, and negates the need for a catalytic reactor and supplemental air pump to add oxygen to the exhaust stream.

Figure 4:
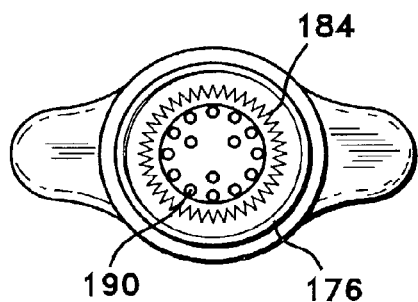
FIG. 4 is an end view of the embodiment of FIG. 2.

In order to provide an extremely long life SmartPlug, it is preferred to seal polymer dielectric 164 to ceramic dielectric 172 as shown at 178 and to seal dielectric 164 to the upper portion of nozzle 170 by threads or concentric rings as shown along the cylindrical surface of 170. It is preferred to provide much larger electrode wear surfaces 184 and 176 than the one, two, or three much smaller wire electrodes of ordinary spark plugs. Larger spark erosion wear surfaces are accomplished by providing an enlarged annular surface electrode 184 as shown in FIGS. 2 and 4.

The result is an integrated fuel metering and ignition system for operation of a heat engine in which fuel is delivered to an integral fuel control valve that is operable to receive pressurized fuel and intermittently deliver pressurized fuel into the combustion chamber of the engine with marked improvements including valve component 149 for minimizing the flow of combustion chamber fluids past the pressure normalization assembly towards the fuel storage and delivery system.

Figure 5:
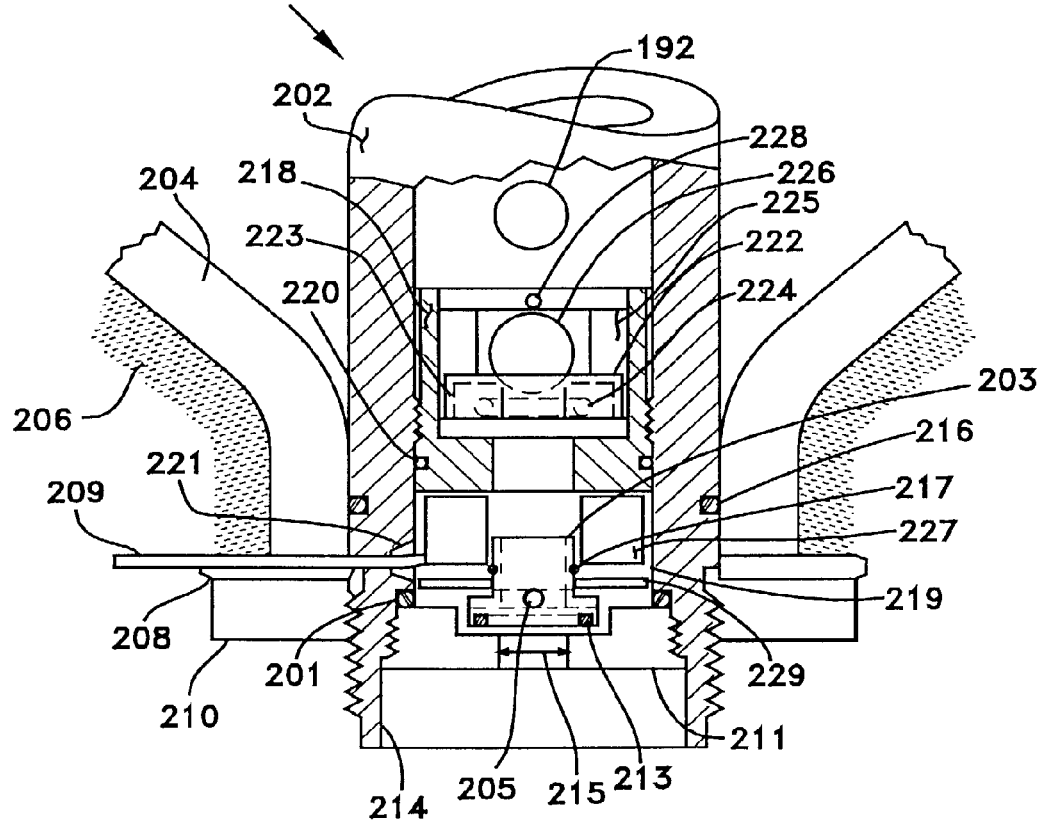
FIG. 5 is a schematic illustration showing components of the invention for storage of pressurized fluids.

FIG. 5 shows a section of the fuel safety storage system embodiment 200. The end of an internal tank tube 202 is shown in position within the end of a composite tank liner 204. Tube 202 is sealed to tank liner 204 by a suitable method including elastomeric or interference seal 216 and held in axial place by nut 210 which is closed against washer 208 which is preferably made of a somewhat elastomeric material to allow for stress distribution due to thermal cycling and to insulate and protect any electrical leads such as 209 to the tank assembly. Reinforcing wraps 206 which are preferably carbon fiber or high strength glass fiber are wet wound with epoxy in patterns that provide axial and radial reinforcement of liner 204 to produce a tank and center tube assembly capable of operation at 3,400 atmospheres including cycling to full pressure 100,000 times from ambient pressure. The surface of the composite tank 200 is preferably protected from penetration by oxygen, water, and other degradants by an abrasion resistant coating of U.V. blocking polymer such as acrylic enamel, potting varnishes typically used by solenoid winders and electronics manufacturers, or thermosetting urethane.

This composite tank cannot be penetrated by six rounds from a .357 Magnum pistol, and withstands the point-blank blast of at least one stick of dynamite, and also withstands impact equivalent to a 100 mph collision. These tests show that such a tank can be used to safely receive daily energy requirements of hydrogen or methane during off-peak loading times to operate a homestead, farm or business for more than 270 years! Similar capabilities are provided for extremely durable vehicle fuel storage.

Tank assembly 200 is made particularly safe by incorporating within central tube 202 an excess flow prevention means such as the assembly housed within internal fitting 218. Excess flow assembly 218 is located within the impact resistant protective envelope of the composite tank and within central tube 202 to protect it from vandals and accidental impact. Excess flow preventer 218 is fastened within tube 202 by a suitable method including threading as shown. Assembly 218 is sealed to tube 202 by a suitable method including elastomeric or interference seal 220. It is preferred to locate the safety check assembly housed in 218 within tube 202 between the first hole 192 and sufficiently above seal 216 to leave room for a valve means such as manual or solenoid operated shut off valve located below but still protected by the super strong envelope of tank composite 204, 206 and tube 202 as shown.

When filling safety tank 200, fluid enters tube 202 preferably through a suitable fitting which is sealed in gland 214 as described regarding the fittings of FIGS. 5, 14, 15, 16, 17, 18, 18, 19, and 20. Entering fluid encounters check valve 203 and like check valve 222 may be of any suitable geometry. Check valve assembly 222 includes check hall 226 and entering fluid lifts moveable seat 222 and integral seal 224 to a latch position against magnetic seat 225 which is held in place by pin 228 which also limits the travel of ball 226 as shown. Any suitable latch may be used including a magnetic latch, a detent consisting of one or more balls that are urged to larger diameter by captured compression springs, or by leaf spring arrangements.

In case a magnetic latch is selected, magnetic stainless steel seat 224 and integral seal 224 is forced by incoming fluid flow to the position shown where stationery permanent magnet 225 holds it in place. Further flow opens check valve 226 to provide quick-fill capabilities to achieve filling to the desired pressure. Check valve element 226 may be urged "normally closed" to the sealed position against the seat in 222 by a suitable spring to produce the cracking pressure desired to cause lifting of seat 222 to the latch position at the desired fluid flow rate for various operational procedures and techniques.

On retrieval of fluid from tank 200, however, only a limited exit rate is allowed before the flow impedance produced in a suitable circuit 223 provided in seat 222 causes sufficient force against seat 222 to force it away from latched position against 225 and to travel to the position against 218 that is sealed by a suitable system including seals such as elastomeric or interference seal 224 as shown. When 222 is sealed against 218, all flow from tank 200 stops. Check valve element 226 seals against 222 and seal 224 prevents flow around seat 222. This prevents a vandal or accidental incident that breaks a delivery tube or fitting downstream from tank 200 from causing tank 200 to be drained. Very quick response to excess flow by this safety feature is assured by the normally closed position of check valve 226 and the limited flow bypass circuit 223.

Tank shut off can also be achieved at any desired time by closure of a suitable manual or solenoid-operated tank valve located above or below 218. A solenoid operated shut off valve is shown which has the feature of allowing inward flow to refill the tank at any time but serves as a normally closed check valve. Shut off is assured when solenoid-operated normally-closed-to-outward-flow check valve 203 is allowed to return to the seat at the inlet of orifice 215 in seat 211 where it is sealed by a suitable method such as o-ring 213. Scat 211 is held in place by any suitable method including the threads shown and scaled to tube 202 by o-ring or interference seal 201. Opening tank valve 203 is achieved by solenoid action when current is supplied by insulated conductor 209 through seal 221 to winding 227. Magnetic force developed on striker disk 229 attracts it rapidly towards coil 227 within bore 219 as shown. Disk 229 is guided by the cylindrical tubular stem of valve 203 which has an annular groove at the distance shown from 229 in the valve closed position. Anchored within the annular groove of 203 is a retainer spring 217 that is about one spring wire diameter larger in assembled outside diameter than the outside diameter of 203. Anchored spring wire 217 provides a strong annular rib that prevents striker 229 from further relative motion as axial travel along the outside diameter of 203.

After gaining considerable momentum as striker disk 229 travels toward electromagnet 227, disk 229 suddenly strikes the retainer spring 217 which quickly lifts 203 off of seat 211 to quickly open the flow through the bore of 203 to six radial holes 205 that provide a total flow area greater than that of bore 215. Flow of fluid from storage in safe tank 200 is established through the bore of 203 to radial holes 205 through bore 215 and to the conduit connected at gland 214.

Extremely safe operation is assured by only powering solenoid operated valve 203 to the open position if conditions for fuel use are determined to remain safe. If the system is in a transportation application, actuation of the seat belts would preferably interrupt the holding current to solenoid winding 227. Similarly if electronic sniffers detect fuel leakage by an engine or appliance, current to solenoid winding 227 is interrupted and 203 immediately closes. If an operator senses danger an "emergency close switch" is actuated and the safety tank is shut off.

FIGS. 6 and 7 show tank 200 in an integrated embodiment that is assembled from a liner 204; filament, reinforcing tape or fiber wrap 206; and tubular member 202. Tank liner 204 is preferably produced as an injection blow molded thermoplastic polymer vessel, by impact extrusion to near net shape followed by rotary swage forming of aluminum, or by grain refinement by cold spin forming or impact forming of a section of metal tube to provide the general configuration shown. Injection blow molded thermoplastic liners made of polypropylene, polysulfone, polyethersulfone, perfluoroalkoxy, and fluorinated olefins offer specialized benefits for a wide variety of applications. Metals such as aluminum, titanium, and stainless steel are also appropriate for various applications. The ends of liner 204 are formed to provide smooth cylindrical surfaces or line bored as shown at area 246 to provide a smooth diameter for O-ring or other suitable seals 244 as shown. O-ring seals 244 in tube 202 are shown in grooves 246 or 248 of the magnified view of FIG. 8.

Tube assembly 202 may provide outlets on both ends as shown with both outlets of the system configuration of FIG. 5 or with one end with the system of FIG. 8. In the instance that pressure relief is needed to accommodate fluid expansion in case the tank is severely crushed or impinged by fire, a pressure relief system including cap 230 is provided as shown. Cap 230 is preferably provided with fusible seal 234 which is made from a suitable alloy or thermoplastic for purposes of being extruded through passageways 232 upon reaching a dangerous temperature or stress. Particularly effective deployment of thermoplastic or fused alloy 234 is provided by manufacturing cap 230 with internal fins generally as shown at 236 for providing faster and more even heat transfer to all sections of the thermoplastic or fusible alloy from the outside of cap 230 or along tube 202 to fusible mass 234. Fins 236 also provide a large surface area, structural integrity, and support of the fusible plug 234 and helps prevent long-term creep of 234 under the pressure of stored gases in tank 200.

Another synergistic benefit of having a high thermal conductivity metal tube 202 inside of tank 200 is to provide heat transfer to fusible plug 234 regardless of the location of concentrated heat input such as from an impinging fire. In the configuration shown, thermal equiaxer fin distributor 236 has six fins that are spaced between the hexagonal pattern formed by the relief ports 232. Torque-free and canceled-thrust pressure relief is accomplished by equal and opposite forces produced when fusible plug 234 is extruded through port(s) 232 followed by six equal and opposite ventings 233 of stored fluid as shown in FIG. 9. This is assured by venting 233 equally from ports 232 that produce opposing and canceling forces.

In case of fire, the internal fins 236 of high thermal conductivity material assures uniform melting of fusible plug 234 and prevents the unwanted situation of having one side of the pressure relief system produce a net torque on the tank assembly by having one of the outlets relieving pressure while the opposite relief ports remain blocked by an unmelted portion of the fusible plug. It is preferred to provide cap 230 with fusible plug 234 manufactured to form an interference fit for sealing tube 202 as shown.

Figure 10:
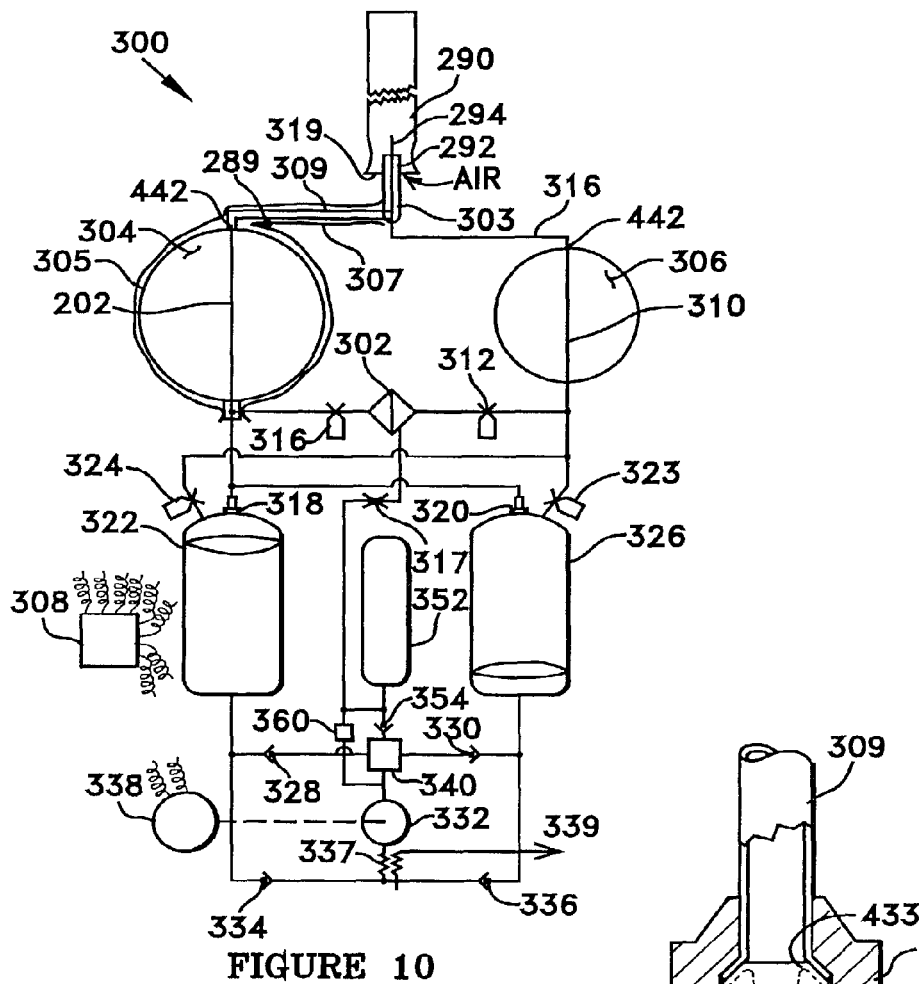
FIG. 10 is a schematic sectional view of an integrated system constructed in accordance with the principles of the invention.

FIG. 10 illustrates an energy conversion system 300 including circuit means and systems for efficiently converting stored pressure energy into work and/or electricity. A reversible electrolyzer 302 separates hydrogen and oxygen from water at high pressure by applying electricity from a suitable source such as surplus hydro, wind, or wave energy, off-peak power from a local energy conversion operation, surplus power from central power plants, regenerative stopping energy of a vehicle, or wheeled energy from cogeneration plants. Hydrogen is delivered to safety tank 304, which is preferably a composite of tube 202, liner 204 and fiber reinforcement 206 as shown in FIGS. 6, 7, and 8. Oxygen is delivered to similar safety tank system 306. These gases are pressurized as the tanks fill by action of electrolyzer 302 through production of many times more volume of each gas than the volume of liquid water converted.

Eventually, safety tanks 304 and 306 are pressurized to the desired capacities corresponding to storage pressures such as 3,000 to 12,000 atmospheres. The safety features of this invention synergistically coupled with the direct pressurization to storage of hydrogen and/or oxygen by electrolysis enable far more compact and efficient energy storage and energy conversion operations than any previous approach. Recovery of pressure and chemical energy potentials are facilitated in multiply provided safety functions including extremely strong containment of stored and conveyed fluids, thermally actuated pressure relief, excess flow shut down, and normally-closed but open if safe conditions exist means for safety controlled valving.

Solenoid valves 312 and 316 are actuated by controller 308 to facilitate delivery to and from the receiver of electrolyzer 302 to hydrogen and oxygen storage as shown. These gases may be used in the same electrolyzer in reverse mode to produce electricity at a later time or the hydrogen and oxygen may be used separately for other desired purposes.

Very quick response to meet emergency and dark-start demands is possible from a generator driven by a suitable engine such as a gas turbine, a piston or rotary combustion engine, or a synergistic engine such as the one shown in FIG. 10. A burst of pressurized oxygen is delivered through solenoid valve 324 to cylinder 322 to instantly start the process of electricity production by generator 338. After start up, hydrogen is injected into the receiver shown to provide conversion of pressure energy to expansive work. Combustion of the hydrogen then provides super heated steam for additional expansion. It is preferred to inject a controlled amount of oxygen just after the engine's equivalent of top dead center which is determined by the setting of flow valve 340 by controller 308.

Hydrogen injected in cylinder 322 mixes with oxygen to form a stratified charge within excess oxygen that has been previously delivered from storage in safety tank 306 through solenoid valve 324. Oxygen deliveries to cylinders 322 and 326 are controlled by 308 to maintain a surplus of oxygen for insulating the steam formed by combustion of stratified-charge bursts of hydrogen injected by solenoid valve and ignition sources called SparkInjectors 318 and 320 which are preferably constructed as shown in FIG. 2 and operated as an adaptive system.

Combustion of the hydrogen produces a high temperature stratified charge of steam accompanied by a pressure rise and delivery of water from check valve 328 to motor 332 which may be of any suitable design including variable stroke axial or radial piston, rotary vane, gear, or turbine type. Pressurization of accumulator 352 to a magnitude above the desired pressure of water entry to electrolyzer 302 is assured. Pressure regulator 317 controls delivery of feedstock water to 302 as needed. Motor 332 powers generator 338 to quickly and efficiently provide electricity on demand. It is preferred to utilize a flywheel with motor 332 or to use a variable displacement motor for the purpose of providing more constant output speed from sinusoidal pressure of deliveries from tanks 322 and 326 as the gas expansion processes are carried out. In the alternative, an invertor may be utilized to condition the output electricity as desired.

Fluid exiting from motor 332 passes through heat exchanger 337 to heat water, air, or some other fluid to which it is desired to add heat. Exhaust fluid from motor 332 then passes through check valve 336 to refill tank 326 and when 326 reaches the condition adaptively controlled by 308 and the setting of valve 340, solenoid valve 323 is briefly opened to allow oxygen make-up just after the liquid piston position passes the expander or engine's equivalent of top dead center. Hydrogen is injected and ignited to form a stratified charge of 6,000 F steam. Pressurized water flows from tank 326 through check valve 330 into suitable motor such as a rotary vane, axial piston, radial piston motor 332 to continue the liquid piston expansion operation. Exhaust from motor 332 passes through heat exchanger 337 and check valve 334 to refill tank 322 to complete one cycle of operation.

Pressure rise in this hydraulic piston expander is extremely fast because of the admission of oxygen which may be followed to meet larger power demands by high speed combustion of pressurized hydrogen within excess oxygen that insulates the hydrogen combustion. Energy conversion efficiency of the hydraulic expander is quite high because of the recovery of pressure energy as oxygen and if needed hydrogen may be delivered into the expansion chambers 322 and 326. Insulated, stratified charge combustion of hydrogen in oxygen, the absence of blow-by typical of normal piston and rotary combustion engines and the exceptionally high temperature of the insulated steam during the expansion provides exceptional thermal efficiency in addition to recovery of pressure energy.

Thermal efficiency is limited by the Carnot Efficiency which is:

$$(T_H - T_L)/T_H = \text{Efficiency} \qquad \text{Equation 1}$$

Where $T_H$ is the start of expansion temperature in absolute degrees, $T_L$ is the end of expansion temperature in absolute degrees Rankine or Kelvin.

Insulated hydrogen combustion in oxygen at 6,000° F. (6,460° R) is readily achievable and expansion over the liquid piston to below 200° F. (660° R) has been achieved. The Carnot limitation for the conversion of hydrogen fuel potential energy to work by the liquid piston expander assembly 322/326; 340, and 332, or assembly 368/370 and 366/367 is thus:

$$(6,460R_H - 660R_L)/6,460R_H = \text{Carnot Efficiency} = 89.8\% \qquad \text{Equation 1.}$$

While practical engines have friction and unharnessed heat losses to reduce the actual efficiency, the practical operating efficiency is improved by the auxiliary recovery of pressure energy as shown. In addition to improving the operational efficiency the high pressure capacity and leak free expansion provided by liquid pistons provides an extremely compact energy conversion system.

The maximum conversion efficiency of the hydrogen fuel cell 302, or reversible electrolyzer 302, is the ratio of actual operating voltage (V) and 1.482 V:

$$\text{Efficiency}_{fc} = V/1.482 \qquad \text{Equation 2}$$

Consequently, operating at ambient conditions, the hydrogen fuel cell efficiency is 1.229/1.482=83% and may be improved by operation at the elevated pressures provided by this invention. In addition to admitting the reactants at high pressure, it is advantageous to further boost the local pressure of hydrogen at the hydrogen electrode, and of oxygen at the oxygen electrode by occasional momentary admission and combustion of a small amount of oxygen in the fuel cell hydrogen receiver and by occasional momentary admission of a small amount of hydrogen in the fuel cell oxygen receiver. These momentary fluid admissions and ignitions are optimized by utilization of the device shown in FIG. 1 or in FIG. 2 for larger applications. Operation of fuel cell 302 at high pressure also greatly improves the current density and reduces the size and mass of the energy conversion hybrid integrated by the invention.

This hybridization provides two extremely high potential efficiency conversion means for rapidly meeting changing needs for electricity and for efficiently storing energy to accomplish load leveling, storage of off-peak power, and greatly improved economics of renewable and non-renewable energy conversion systems.

The highest pressure produced in tanks 322 and 326 is delivered through check valve 354 to accumulator 352 for controlling the inventory of water in the engine and for supplying reversible electrolyzer 302 with feedstock water to produce hydrogen and oxygen as shown. This combustion sourced pressure boosting greatly simplifies pressurization of accumulator 352 and/or reversible electrolyzer 302 or in the operation of one or more duplicates of 302 (not shown) that can be operated simultaneously or as needed at a lower temperatures for higher efficiency compared to conventional multistage pumping.

At times that more or less water is desired in the expander inventory to effectively change the displacement, solenoid valve 360 is opened by controller 308 to add or subtract water in the inventory and thus reduce or add to displacement. This same feature may be utilized at appropriate times to properly balance the inventories of water in the engine, electrolyzer, and the hydrogen and oxygen stored in safety tanks 304 and 306.

Figure 11:
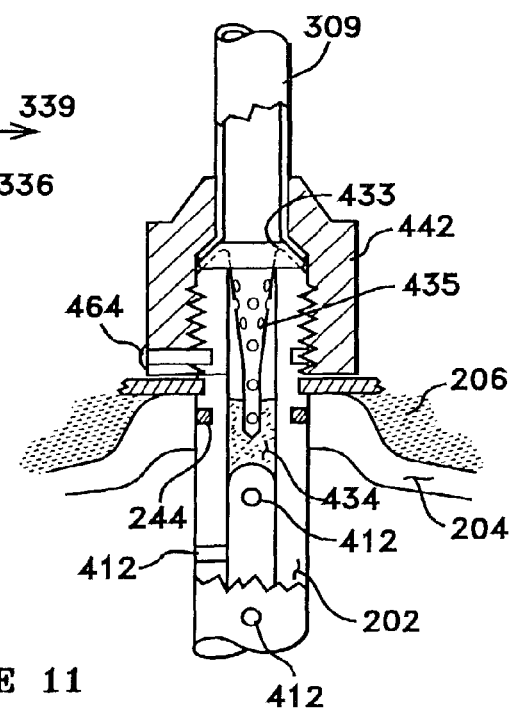
FIG. 11 is an enlarged view of components constructed in accordance with principles of the invention.

In the instance that it is desired to transfer fluids that escape from tanks such as 200 to a more distant location, it is preferred to utilize cap 442, perforated support cone 433 and line 309 as shown in FIGS. 10 and 11. Catalytic combustor 309, 303, and 290 shows how to automatically dispose of leaking fuels such as hydrogen, landfill gas, and natural gas as such fuels are vented from tank 304.

When assembled, tube 202 is preferably held in assembly with tank 200 by snap rings, spiral locks, or crimp formed washers 207 that fit into groove 244 to keep tube 202 from being expelled from tank 200. Fluid flow into and out of tank 200 is provided by holes 194 which are preferably provided as penetrations through one wall only for purposes of retaining high strength.

In case a fire impinges the area where safety tanks 304 and 306 are located, fusible plugs are melted in cap(s) 442 which are shown in detail in FIG. 11. This allows the sale delivery of fluids from storage without over-pressurization due to heat addition. Such emergency delivery of fluid combustants such as hydrogen and oxygen are preferably to a safe combustor assembly 290 in which air is drawn by the momentum of combustants that enter through coaxial nozzles 292 and 294.

If only hydrogen is vented into 290 through nozzle 294 it mixes with ingested air and is combusted after catalytic or spark ignition preferably as described regarding the SparkInjector or SmartPlug regarding FIGS. 1 and 2. When oxygen is also vented it is added coaxially through 292 to the hydrogen to be safely burned in 290 as shown. Burner 290 is generally constructed as a thermally isolated chimney or vent tube to the atmosphere and provides a safe place to continuously and harmlessly vent and/or combust any gases delivered in an emergency from safety tanks 304, 306 and other safety tanks that may be connected to the same gas disposal system.

Fail-safe provisions protect in other events along with impingement by fire or other heat sources. Elastomeric membrane 305 encloses tank 304 including the fittings attached to 304. If a leak in the tank or fittings occurs, the leaked hydrogen will be sensed by suitable instrumentation 289 and controller 308 will shut off normally closed valve 203 in tube 202 and depending upon the magnitude of the detected presence of hydrogen, a suitable alarm will be provided to alert service personnel or initiate emergency procedures. Any hydrogen that is leaked will be contained by 305 which is connected by line 307 to combustion tube 303 within 290. Similar provisions (partially shown) detect and deliver any oxygen leakage from tank 306 to 290 for safe disposal.

In dwellings it is anticipated that 290 would be installed generally as are chimneys of water heaters or furnaces. In transportation applications it is preferred to place burner assembly 290 in parallel with the exhaust pipe or tail pipe from the engine or to utilize a portion of the exhaust system for the dual purpose of delivering exhaust from the engine and for safe combustion of fuel from pressure relief of stored fuel. The same purpose of gas disposal and safe discharge of hot gases to an out-of-the-way location applies for both applications.

It is contemplated that in some instances it will be desired to place one or more check valves 319 at the air entrance shown to assure that the discharge always flows in the direction of the momentum of fuel and/or other gases that enter 290. Providing check valves 319 in this location maintains assurance that vented products or related heating is directed toward the outlet at the opposite end of 290. Such check valves block unwanted ingress of outside air, insects, and dust from the area where tanks 304 and/or 306 are located.

Figure 12:
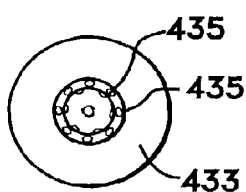
FIG. 12 is an end view of the components constructed in accordance with the principles of the invention.

FIG. 11 shows details of the preferred thermally actuated pressure relief system for applications where it is preferred to dispose of relieved hydrogen and/or oxygen in 290 as shown in FIG. 10. Relatively thin walled delivery line 309 is flared as shown to be held in place against the conical taper seal surface of insert support cone 433 which is preferably a corrosion resistant alloy such as beryllium copper or stainless steel with perforations 435 as shown that provide a total flow area comparable to the flow area of tube 202. The portion of 433 extending beyond the seal cone between the tapered end of heavy walled tube 202 and flanged tube 309 is preferably corrugated as shown in the end view of FIG. 12 to provide more surface area for heat transfer to fusible plug 434 and to maintain the gas passage area suitable for emergency venting operations.

Perforated cone cup 433 supports and serves as an intimately contacting heat exchanger for fusible safety-seal pellet 434 which may be made of a fusible alloy or a thermoplastic that softens at the desired temperature for purposes of being extruded into the larger bore of 309 to allow the gas in storage to be vented for safe and automatic disposal in 290.

Fusible pellet 434 is preferably inserted in 202 with interference to seal against the bore of tube 202 as shown. An advantageous method of setting 434 is to push it into place with a tool fixture that supports cone 433 and to then contain and impact it or heat it to set it in compacted interference with tube 202 with another tool inserted from the other direction within tube 202.

It is preferred to secure nut 442 in place with a suitable system such as lock pin 564 as shown or toggle lock 516 which is constructed as disclosed regarding FIGS. 15, 16, 17, and 18. The assembly shown in FIG. 14 includes spiral lock 476 which tightens on tube 458 if nut 468 with right-hand thread is rotated counterclockwise and holds tube 458 in place within the gland of tube fitting 456 to maintain the seal by o-ring or interference seal 466.

It is to be understood that the principle of placing critical safety and control components within the protective envelope of the composite tank can be readily practiced by locating assembly 433, 434, and 435 into 202 sufficiently to be well within the protective envelope of composite 204, 206 and 202. Being remote from impact and beyond the reach of vandals does not deter the safety functionality of this embodiment of the invention. Thermal conduction to the fusible pellet 434 is accomplished from both ends of the host safety tank by tube 202 and is enhanced by intimate contact with the extended surface configuration of 236 or 433. This assures quick and dependable fusion of 434 to prevent heating of contained fluid to the point of causing dangerous over pressurization of the host vessel.

Safety is assured by the features of tube 202 as it is integrated with the composite tank features as shown regarding tank 200 with features 204, and 206; and 304, 305, 290, 303, 311, and 309. Particularly safe, cost-effective, and efficient operation is assured including provisions for safe emergency disposal functions with stored fluids at pressures of 12,000 atmospheres or less.

Figure 13:
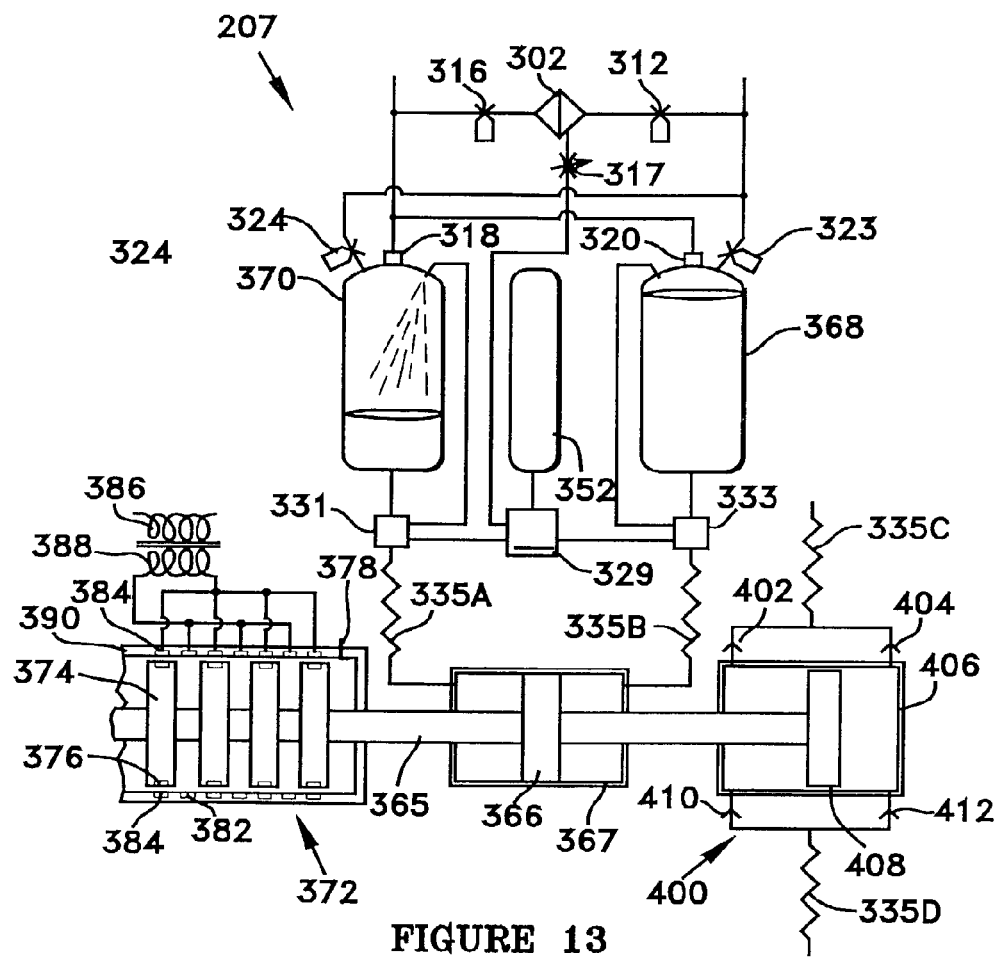
FIG. 13 is a schematic view of a system configured in accordance with the principles of the invention.

Another embodiment of the hydraulic piston engine is shown in FIG. 13 in which axial thrust of piston 366 in cylinder 367 is converted into electricity or performs other useful work. Linear motor 366/367 may be of any suitable design including the configuration shown in which piston assembly 366 moves back and forth due to the flow of liquid inventories to and from 368 and 370 as gases in the upper portion alternatively expand to perform work.

Upon return of water from the left side of 367 to tank 370 it is preferred to provide a spray blast as shown which is directed by shuttle valve 331 for a short time for distribution from the top of tank 370 for cooling purposes and condensation of spent steam vapor. This return spray is to quickly cool spent vapors but not cool tank 370 and is generally a cone shape with the base diameter just smaller than the diameter of tank 370 where the cone spreads to fill the bottom of the tank as shown.

Similarly, upon return of water from the right side of 367 to 368 it is preferred to actuate solenoid operated shuttle valve 333 as shown to provide a short spray blast from the top of the tank as shown to condense spent steam vapors. Shuttle valves 331 and 333 provide optional flows to accumulator 352 and to the tanks 368 and 370 and are adaptively controlled by controller 308 to optimize the efficiency or power production or failsafe modes of operation. Cooler water for spray down of spent vapors can also be occasionally supplied from 352 through shuttle valve 329 which is also adaptively controlled by 308.

Electricity is produced by generator assembly 372 in which electrostatically charged disks 374 are driven by piston 366 to move back and forth with respect to spaced stationery conductors 382 and 384 to produce an alternating current which may be applied to any useful application which may include power conditioning as illustrated with step-up or step-down transformer 386/388.

Disks 374 are preferably made of a suitable dielectric material such as a glass filled polyolefin, polyester, or thermoset resin and have a metallized circumferential rim 376 where electrostatic charges are isolated. As a group, conductive bands 376 on disks 374 are isolated by being spaced apart but are electrically connected to each other for purposes of being charged by occasional contact with lead 378 which is used to impart a charge such as a high voltage accumulation of electrons on bands of 376. Charging can be accomplished by momentarily contact when piston 366 is at the far right end of cylinder 367 which causes 378 to contact the closest band 376. A suitable high voltage source is applied while 376 contacts 378 to charge the reciprocating assembly.

Charging lead 378 may be occasionally connected to a suitable source such as transformer 386 or through a rectifier for replenishing zones 376 with additional electrons as needed to restore any gradual loss of charge density. Illustratively, negative charge conditions on bands 376 are shown in FIG. 13 but the charge could as well be a positive charge.

Dielectric tube 390 supports an assembly of spaced metallic bands 382 and 384 of a suitable metal such as copper, silver, or aluminum. Bands 382 and 384 may be inside of 390 or outside of 390 or held as composited components of 390 which is preferred to mechanically stabilize and protect these bands from environmental degradation. These bands may be occasionally connected to a charging source to impart a charge such as a high voltage accumulation of electrons on bands 382 and 384.

Reduction in air drag on disks 374 is achieved by replacing the air in 390 with hydrogen from reservoir 304. Hydrogen provides much greater heat transfer capabilities than air for the purpose of transferring heat from the assembly. It is preferred to maintain the pressure of hydrogen in 390 at an adaptively determined magnitude that minimizes gas drag and ohmic losses due to temperature rise in current carrying conductors while controlling the gap between rims 376 and rings 382 and 384 to maximize generator efficiency. This is adaptively controlled by computer 308.

Figure 13A:
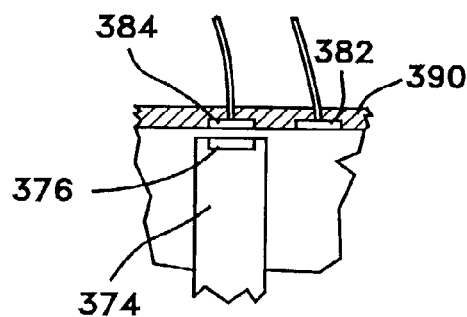
FIG. 13A is a magnified view of components shown in FIG. 13.
Figure 14:
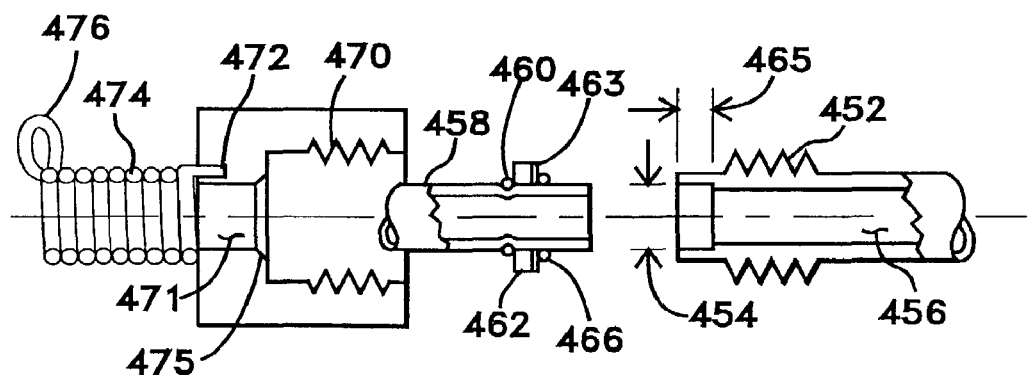
FIG. 14 is a partial sectional view of an embodiment of the invention.

It is preferred to operate zones 382 and 384, the primary winding 388 of transformer 386, and zones 376 with the same charge and to also replenish this charge periodically for purposes of maintaining a high current magnitude in primary 388. Conductors 382 and 384 may be connected in any desired way however to produce electricity including the parallel connections shown in FIG. 13. FIG. 13A shows magnified details of stationery bands 384 and 382 in tube 390 along with typical band 376 on reciprocating disk 374.

When charged bands 376 are near conductive bands 382 as shown, electrons are repelled from 382 to pass through primary winding 388 of transformer 386 and then flow to bands 384. When charged bands 376 are forced by piston 366 to locations near conductive bands 384, electrons are forced from zones 384 through primary 388 to zones 382 to complete one cycle of alternating current production.

In some applications it may be desired to increase the charge density on disks 374 for such purposes as decreasing the size of the generator assembly, increasing the distance of spacing between charge collector rings 382 and 384, or for another optimization purpose. One way to increase the charge density is to deposit miniature whiskers on conductive rims 376. This may be done by brazing particles to rim 376 while charge is applied to erect acicular particles or by numerous special techniques based on chemical vapor deposition, sputtering, and plating from an aqueous solution.

The invention can also be practiced by operating on a repulsive-force basis with a surplus or negative or positive charges or by operating on an attractive-force basis by charging rings such as 376 and 384 with oppositely charged particles. It is also contemplated that assembly 374 in 390 can be reciprocated by a suitable crank, cam or gear set mechanism from prime movers including conventional piston engines, rotary combustion engines, in-stream hydro turbines, wind turbines and wave generators as disclosed in my copending patent applications.

Current produced by the linear generator may be conditioned as needed by transformer 386 and/or by a suitable invertor (not shown). Work performed by piston motor 366 may also be directly applied to other useful applications such as driving pump 400.

Pump 400 is illustrated in general representing such applications as a water pump or a compressor of a heat pump. Piston assembly 408 is reciprocated within cylinder 406 by power piston 366 as shown. Fluid enters through optional heat exchanger 335C and alternately through check valves 402 and 404 as shown. Fluid exits through check valves 410 and 412 as shown. In the instance of a water pump it is intended that heat exchangers 335A and 335B deliver heat rejected by the engine to heat water in heat exchanger 335D for useful purposes. Similarly in instances that a heat pump compressor is driven it is intended to heat the working fluid by adding heat rejected by the engine through 335A and 335B in heat exchanger 335C and/or 335D.

The same regime of pressure and chemical potential energy conversion as accomplished by direct injection to an internal combustion engine or other suitable expander applies to many other engine types along with the liquid piston type of engine described regarding FIGS. 10 and 13. Illustratively, this pressure and chemical energy conversion regime pertains to two and four stroke piston engines, rotary combustion engines, free piston engines, bladed gas turbines, Tesla turbines and to direct injection of oxygen by 323 and 324 and hydrogen by 318 and 320 alternately to opposite sides of an expander similar in construction and disposition to cylinder 367 and piston 366. It is preferred in larger power installations to utilize both the directly injected dry piston version of 366/367 along with the liquid piston engine for extremely quick response to black start conditions or to quickly supply peak loads and to pressurize accumulator 352 and reversible electrolyzer or fuel cell 302 as needed.

The result is an energy conversion system in which electricity and/or heat is used to dissociate a fluid such as water, aqueous electrolytes with a pH less than seven, aqueous electrolytes with a pH greater than seven, and vapors containing molecules of water into hydrogen and oxygen in which the hydrogen is stored as a pressurized fluid and the oxygen is stored as a pressurized fluid. This oxygen is occasionally used in the reverse mode of electrolyzer 302 which operates as a fuel cell or it is metered into the combustion chamber of a heat engine. Similarly pressurized hydrogen is occasionally used in the reverse mode of electrolyzer 302 or metered into the combustion chamber and ignited to provide energy release for expansive work performed by the heat engine.

It is preferred to electrolyze fluids in 302 at higher temperatures than the temperature that 302 is operated as a fuel cell. This enables higher operating efficiency in the electrolyzer mode and in the fuel cell mode. It provides an important option for hybrid optimization of energy conversion to meet small or large power production needs by adding the outputs of 302 and 338 or 302 and 386/388 along with enabling very rapid conversion of surplus electricity into stored chemical potential and pressure potential energy.

Conversion of pressure and chemical potential energy compliment each other in a synergistic integration of technologies including generation of electricity and/or other work output with greatly reduced weight and minimized requirements for expensive metals such as copper, aluminum, and special steels. Illustratively, liner 204 can be a thermoplastic blow molded material such as polyethylene, polypropylene, polybutylene or polymethylpentene made from natural gas liquids. Composited fiber 206 can be a graphitic yarn or filament made from natural gas by dehydrogenation of methane or of polyacrylonitrile (PAN).

Extremely strong versions of tube 202 can be made from composited epoxy and graphite fibers of dehydrogenated PAN origins and are preferred for storage of fluids at 6,000 to 12,000 atmospheres. Piston and cylinder 366/367 and 406/408 are preferably made as carbon graphite composites of the same origins. Injection molded disks 374 are preferably made of thermoplastic produced from natural gas and/or renewable hydrocarbons as is cylinder 390.

Reversible electrolyzer 302 may utilize a semipermeable membrane of ceramic or polymer origins depending upon the optimization desired, electrodes made largely of carbon, and is housed within composited pressure resisting containment tank constructed according to the structural, design, and safety principles of this invention.

FIGS. 14, 15, 16, 17, 18, 19 and 20 show embodiments for providing relaxable vibration and tamper resistant connections for delivery of stored fluid through conduits. Tube 458 is prepared by forming a circumferential groove, perpendicular to the tube axis, located near the end of the tube as shown within which a circular wire form 460 fits. Such a circumferential hoop can be made by selecting a closely coiled cylindrical tension spring of suitable material that has a mean wire diameter that is about the same as the outside diameter of tube 458. The closely coiled spring is elastically stretched over a conical lead of a cylindrical mandril to a diameter sufficient to allow a saw cut width of the spring wire to be removed from each turn of the spring loaded on the mandril with the result being production of an individual spring lock with the mean diameter of the outside of tube 460.

In some applications, especially at relatively low pressure, it is preferred to use a lock ring 460 with square or rectangular cross section which has an outside diameter that closely fits bore 454 when lock ring 460 is installed in the annular groove of tube 458 for the purpose of directly backing up seal 466 in gland 465. In this instance it is preferred to use a seal 466 with a square, rectangular, or truncated-wedge cross section.

Nut 468 is provided with an internal thread 470 that mates the external thread 452 of male fitting 456 such as might be on a tee, ell, coupling, valve or instrumentation component. The diameter of bore 471 closely fits the outside of tube 458.

Fitting 456 is manufactured to have a suitable finish and diameter 454 and/or a sealing surface at cylindrical dimension 465 in bore 454 that is suitable for an elastomeric face seal with 466. Seal 466 may be an o-ring or any other suitable cross section of elastomeric material and is preferably held in assembly with tube 458 and backup washer 463 (if utilized) by a small amount of adhesive. The length of bore 465 is preferably sufficient to allow nut 468 to be backed up one or more turns without loss of sealing quality by seal 466 against bore 454. This provides much greater assurance of safe storage and conveyance of fluids than conventional fittings that leak if the tube nut does not supply constant force against fitting components that are held in compression against each other to form a seal.

Backup washer 463 is preferably fits closely within bore 454 and is made of a polymer with chemical compatibility for the application such as a polyamide, a polyolefin, or polysulfone. Backup washer 463 is preferably supported by steel, stainless steel, aluminum, or brass washer 462 that closely fits tube 458 on the inside diameter and bore 454 on the outside diameter. Circumferential lock ring 460 in the annular groove shown prevents the assembly of washer 462, backup 464 and seal 466 from moving towards nut 468. Nut 468 is similarly prevented from moving axially toward the near end of tube 458 by lock ring 460. Nut 468 is preferably counter bored or chamfered as shown at 475 to provide homing force against lock ring 460 to hold it in the annular groove in tube 458.

Spring coil 474 is attached to nut by any suitable means such as welding, brazing or insertion of an end 472 into a hole in 468 as shown. Spring coil 474 is manufactured to be in interference with the outside of tube 458 and wound so it will be loosened by friction forces against tube 458 when nut 468 is being advanced on thread 452. Conversely, spring 474 is tightened on tube 458 by turning nut 468 in the loosening direction. The purpose of spring 474 is to tighten against tube 458 to prevent continued loosening rotation if nut 468 is rotated in the loosening direction. When it is desired to loosen nut 468, spring 476 is manually torqued at loop 476 in the loosening direction while nut 468 is rotated to loosen.

FIGS. 16, 17 and 18 show another embodiment of the invention 480 in which tube nut 482 is provided with a straight knurl or spline geometry 530 on the outside diameter as shown in FIGS. 16 and 17. Spring lock 484 is fitted in an annular groove in tube 488 which is preferably prepared by one or more forming rolls of a hand-operated or power roll tool. Roll forming the desired annular groove in tube 458 or 488 improves the grain structure and locally strengthens the tube. Roll forming the annular groove can be accomplished by use of a hardened I.D. mandril that is inserted into tube 458 or 488 to prevent diametrical closure and loss of flow area or by allowing a streamlined annular indentation that generally does not cause an unacceptable impedance for the fluid transfer applications where it is used.

Seal adapter 486 is preferably manufactured as a composite as shown in the enlarged cross-section of FIG. 19. Portion 490 is preferably a suitable polymer such as a polysulfone, polyamide, polyolefin, or polyester that is formed as shown to support elastomeric seal 498 within gland 500 of fitting 506 as shown. Steel, stainless steel, brass, titanium, or aluminum washer 494 fits closely within gland 500 and on tube 488 and has holes 492 and/or slots in the interface with polymer 490 to hold 490 in assembly with washer flange 494.

It is preferred to injection mold 490 to the shape shown with molded material filling holes 492 to lock the composite together. Washer 494 is preferably made with the illustrated annular groove 520 that allows it to snap over lock spring 496 when it is in place in the groove shown in tube 488 or 544. It is preferred to use lock spring wire that is circular in cross section for most applications but specialized applications may use square, hexagonal or other wire cross sections.

In instances that specialized functions are desired, adapter 490 may be made of a chemically compatible material with desired properties. Illustratively, it is preferred to use titanium or tetrafluoroethylene tubing 488 and to mold an elastomeric copolymer based on polyvinylidene fluoride and hexafluoropropylene or FEP Teflon in the shape shown with a durometer hardness of 60 to 90 for composite component 490 and to utilize a titanium or polyethersulfone washer 494 for conveyance of extremely corrosive fluids such as ferric chloride solutions, acids, hydrogen fluoride vapors, and salt solutions. This composite seals gland 500 quite well without the use of a separate O-ring 498. The higher the fluid pressure, the more the wetted face of 490 is pressed against tube 488 and gland 500 to form a bubble-tight seal.

When the components of the embodiment of FIG. 17 are assembled by mating threads 502 and 504, with seal 498 in gland 500, anti-rotation locks 516 are closed to interlock in axial knurls or splines 530 as shown in FIGS. 16, 17, and 18. Anti-rotation locks 516 may be held in place against nut 482 by the toggle action of asymmetric bearing surfaces 513 that provide two homing positions, the closed position against threads 504 and the open position about 110° rotation away from threads 504.

One or more anti-rotation locks 516 are secured in place by any suitable attachment to fitting 506 including the hinge pins 510 and 512 to formed collar base 508 as shown in FIGS. 17 and 18. Anti-rotation locks 516 are preferably made from sheet metal that is formed to the shape shown for assembly with formed collar 508 by headed hinge pins 510 and 512. After being placed on fitting 506 collar 508 may be staked, crimped, spot welded, brazed, or held securely with adhesives such as anaerobic glue or epoxy.

Figure 15:
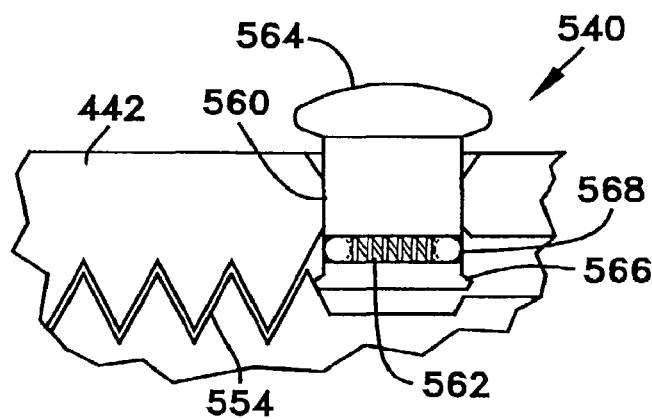
FIG. 15 is a partial sectional view of an embodiment of the invention.

An alternative anti-rotation system 540 for tube nut 542 or 442 is shown in FIG. 15 and in FIG. 20. One or more detented locks 564 as shown in FIGS. 15 and 20 are provided for preventing tube nuts such as 442 or 542 from un-threading from fittings such as 546 which is shown in partial section. As shown there are two stable detent positions of lock 564 in hole 560. Lock 564 is stable in the "open" position for allowing removal of nut 542 when ball 568 is urged by spring 562 to advance to a larger diameter of the outer conical portion of hole 560 in nut 542. Lock 564 is stable in the "locked" position when ball 568 is urged to a larger diameter after clearing hole 560 by inward travel. In the locked position, 564 engages the O.D. threads and/or an annular groove in 546 to block axial travel of tube nut 542 thus preventing nut 542 from unthreading. This keeps seal 552 in place within the gland shown of fitting 546 to assure constant bubble-tight sealing.

Ball 560 is held in a cross hole by slightly closing the diameter of the cross-hole to retain ball 568 after insertion of spring 562 and ball 568. An opposing ball of the same or different diameter may be used on the opposite side of ball 568 as shown. This type of anti-rotation lock is capable of withstanding high accelerations due to impact, vibration and hammering to assure that the chosen seal such as 460 and 466; or 462, 464, and 466; or 494, 490 and 498; or 548 and 550 stays engaged in the gland provided by the fitting to perform the intended bubble-tight function.

It thus will be understood that the objects of this invention have been fully and effectively accomplished. It will be realized, however that the foregoing preferred specific embodiments have been shown and described for the purpose of illustrating the functional and structural principles of this invention. These preferred descriptions are subject to change without departure from such principles. Therefore, my invention includes all modifications encompassed within the spirit, scope, and legal equivalences of the following claims.

REQUEST UNDER MPEP 707.07(j): The undersigned a pro-se Inventor-Applicant respectfully requests that the Examiner find the patentable subject matter disclosed in this invention and if he feels that the Applicant's present claims are not entirely suitable that the Examiner draft allowable claims for the Applicant that define the breadth and scope required to facilitate commercialization of the inventions herein.

What is claimed is:

1. A fuel injector configured to inject fuel into a combustion chamber, the fuel injector comprising:
    a body having a base portion opposite a nozzle portion, wherein the base portion is configured to receive the fuel into the body, and the nozzle portion is configured to be positioned adjacent to the combustion chamber;
    a valve assembly carried by the base portion of the body, the valve assembly having—
        a first valve coupled to a first actuator;
        a second valve coupled to a second actuator, wherein the first actuator is independently movable from the second actuator to introduce the fuel into the base portion, and the second actuator is independently movable from the first actuator to introduce the fuel into the nozzle portion for direct fuel infection into the combustion chamber; and
    an igniter carried by the nozzle portion of the body positioned immediately adjacent to the combustion chamber and configured to ignite the fuel in the combustion chamber.

2. The fuel injector of claim 1 wherein the first valve moves in an opposite direction of a flow of the fuel into the base portion.

3. The fuel injector of claim 1 wherein the second valve moves in an opposite direction of a flow of the fuel into the base portion.

4. The fuel injector of claim 1, further comprising a biasing member that urges the second actuator in a direction of flow of the fuel to retain the second valve in a closed position.

5. The fuel injector of claim 1, further comprising an electromagnetic winding adjacent to the second actuator, wherein the electromagnetic winding selectively drives the second actuator to move the second valve between a closed position and an open position.

6. The fuel injector of claim 1, further comprising a fuel passage extending at least partially through the second actuator, wherein the fuel flows through the second passage to flow from the base portion to the nozzle portion.

7. The fuel injector of claim 1, further comprising a computer component carried by the base portion, wherein the computer component is configured to adaptively vary flow of the fuel through the fuel injector.

8. The fuel injector of claim 7, further comprising a pressure sensor coupled to the computer component, wherein the pressure sensor is carried by at least one of the base portion and the nozzle portion, and wherein the computer component is configured to adaptively vary the flow based at least in part on a combustion chamber property detected by the pressure sensor.

9. A fuel injector configured to inject fuel into a combustion chamber, the fuel injector comprising:
    a body having a base portion opposite a nozzle portion, wherein the base portion is configured to receive the fuel into the body, and the nozzle portion is configured to be positioned adjacent to the combustion chamber;
    a valve assembly carried by the base portion of the body, the valve assembly having—
        a first valve coupled to a first actuator;
        a second valve coupled to a second actuator, wherein the first actuator is independently movable from the second actuator to introduce the fuel into the base portion, and the second actuator is independently movable from the first actuator to introduce the fuel into the nozzle portion;
    an igniter carried by the nozzle portion of the body and configured to ignite the fuel in the combustion chamber; and
    a third valve carried by the nozzle portion, wherein the third valve is independently movable from the first and second valves to introduce the fuel from the nozzle portion into the combustion chamber.

10. The fuel injector of claim 9 wherein the third valve moves in a direction of a flow of the fuel out of the nozzle portion.

11. The fuel injector of claim 9, further comprising a biasing member that urges the third valve in an opposite direction of the flow of the fuel to retain the third valve in a closed position.

12. The fuel injector of claim 9 wherein the igniter comprises an electrode that develops an ignition event across a gap with the third valve.

13. A fuel injector for injecting fuel into a combustion chamber, the fuel injector comprising:
    a first end portion opposite a second end portion, wherein the second end portion is configured to be positioned adjacent to the combustion chamber;
    a first valve at the first end portion to introduce the fuel into the first end portion;
    a second valve at the first end portion, wherein the second valve moves independently from the first valve to introduce the fuel into the second end portion for direct fuel injection into the combustion chamber; and
    an igniter integral with the second end portion positioned immediately adjacent to the combustion chamber, wherein the igniter is configured to ignite the fuel as the fuel flows into the combustion chamber.

14. The fuel injector of claim 13, further comprising:
    a first actuator coupled to the first valve, wherein the first actuator moves the first valve in a first direction from a closed position to an open position; and
    a second actuator coupled to the second valve, wherein the second actuator moves the second valve in a second direction from a closed position to an open position, and wherein the second direction is opposite the first direction.

15. The fuel injector of claim 14 wherein the first direction is generally parallel to a direction of fuel flow through the first and second end portions.

16. The fuel injector of claim 14, further comprising a third valve at the second end portion, wherein the third valve is independently movable from the first and second valves to introduce the fuel into the combustion chamber.

17. The fuel injector of claim 16 wherein a pressure of the fuel in the second end portion moves the third valve from a closed position to an open position to introduce the fuel into the combustion chamber.

18. The fuel injector of claim 14, further comprising:
    a sensor carried by at least one of the first and second end portions, wherein the sensor is configured to detect one or more properties of the combustion chamber; and
    a computer component coupled to the sensor, wherein the computer component is configured to control at least one of the first and second valves based at least in part on feedback from the sensor.

19. The fuel injector of claim 13, further comprising a dielectric fuel passage extending longitudinally along at least a part of the second end portion, wherein the dielectric fuel passage is configured to receive the fuel after the fuel passes beyond the second valve.

20. A fuel injector for injecting fuel into a combustion chamber, the fuel injector comprising:
a body having a base portion opposite an end portion;
first means for selectively introducing the fuel into the body, wherein the first means is carried by the base portion of the body;
second means for selectively metering flow of the fuel through the body, wherein the second means is carried by the base portion of the body proximate to the first means providing for direct fuel injection into the combustion chamber; and
third means for igniting the fuel as the fuel exits the nozzle portion, wherein the third means is carried by the end portion of the body and is positioned immediately adjacent to the combustion chamber.

* * * * *

UNITED STATES PATENT AND TRADEMARK OFFICE
CERTIFICATE OF CORRECTION

PATENT NO.         : 8,311,723 B2
APPLICATION NO.    : 13/021658
DATED              : November 13, 2012
INVENTOR(S)        : Roy Edward McAlister It is certified that error appears in the above-identified patent and that said Letters Patent is hereby corrected as shown below:

On Title page 2, item (56); in column 2, under "Other Publications", line 6, delete "Inejct" and insert -- Inject --, therefor.

In the Specifications
In column 3, line 22, delete "scaling" and insert -- sealing --, therefor.

In column 3, line 39, delete "hybrized" and insert -- hybridized --, therefor.

In column 5, line 10, delete "scaled" and insert -- sealed --, therefor.

In column 8, line 5, delete "scaled" and insert -- sealed --, therefor.

In column 9, line 24, delete "hall" and insert -- ball --, therefor.

In column 9, line 66, delete "Scat" and insert -- Seat --, therefor.

In column 10, line 1, delete "scaled" and insert -- sealed --, therefor.

In column 14, line 12, delete "sale" and insert -- safe --, therefor.

In column 17, line 17, delete "or" and insert -- of --, therefor.

In column 19, line 2, delete "scaling" and insert -- sealing --, therefor.

In the Claims
In column 21, line 23, in claim 1, delete "infection" and insert -- injection --, therefor.

Signed and Sealed this
Twenty-first Day of May, 2013

Teresa Stanek Rea
*Acting Director of the United States Patent and Trademark Office*